United States Patent
Oh et al.

(10) Patent No.: US 9,532,347 B2
(45) Date of Patent: Dec. 27, 2016

(54) METHOD AND APPARATUS FOR ALLOCATING RESOURCES IN A WIRELESS COMMUNICATION SYSTEM

(75) Inventors: Chang-Yoon Oh, Yongin-si (KR); Jae-Jeong Shim, Seongnam-si (KR); Jung-Je Son, Yongin-si (KR); Yeong-Moon Son, Yongin-si (KR); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1653 days.

(21) Appl. No.: 12/253,768

(22) Filed: Oct. 17, 2008

(65) Prior Publication Data
US 2009/0103487 A1 Apr. 23, 2009

(30) Foreign Application Priority Data

Oct. 18, 2007 (KR) .................. 10-2007-0105287
Jan. 4, 2008 (KR) .................. 10-2008-0001491
Aug. 5, 2008 (KR) .................. 10-2008-0076553

(51) Int. Cl.
*H04W 72/04* (2009.01)

(52) U.S. Cl.
CPC ................... *H04W 72/042* (2013.01)

(58) Field of Classification Search
CPC .................................................. H04W 72/042
USPC .......... 370/329, 431, 462; 455/450–455, 464
See application file for complete search history.

(56) References Cited

U.S. PATENT DOCUMENTS

| | | | |
|---|---|---|---|
| 6,333,936 B1 * | 12/2001 | Johansson et al. ........... 370/449 |
| 7,742,470 B2 * | 6/2010 | Hwang et al. ................ 370/389 |
| 2006/0154671 A1 | 7/2006 | Kang et al. |
| 2007/0165567 A1 * | 7/2007 | Tan et al. ..................... 370/329 |
| 2007/0189197 A1 | 8/2007 | Kwon et al. |
| 2007/0206561 A1 | 9/2007 | Son et al. |
| 2008/0062944 A1 * | 3/2008 | Smith et al. .................. 370/342 |
| 2009/0075667 A1 * | 3/2009 | Bourlas ...................... 455/452.1 |
| 2009/0170522 A1 * | 7/2009 | Tirkkonen et al. ......... 455/452.1 |
| 2009/0325585 A1 * | 12/2009 | Farajidana et al. ........... 455/450 |
| 2010/0246498 A1 * | 9/2010 | Lim et al. ..................... 370/329 |

FOREIGN PATENT DOCUMENTS

| | | | |
|---|---|---|---|
| KR | 10-2007-0065549 A | 6/2007 |
| KR | 10-2007-0080735 A | 8/2007 |
| WO | 2007/045101 A2 | 4/2007 |

* cited by examiner

*Primary Examiner* — Brian D Nguyen
*Assistant Examiner* — Ashil Farahmand
(74) *Attorney, Agent, or Firm* — Jefferson IP Law, LLP

(57) ABSTRACT

A method for allocating resources by a Base Station (BS) in a wireless communication system is provided. The method includes determining use/nonuse of each of a plurality of Resource Blocks (RBs), which are allocated using a persistent allocation scheme, and transmitting resource allocation information indicating use/nonuse of each of the plurality of RBs to a plurality of Mobile Stations (MSs) according to a result of the determination.

37 Claims, 20 Drawing Sheets

METHOD AND APPARATUS FOR ALLOCATING RESOURCES IN A WIRELESS COMMUNICATION SYSTEM

PRIORITY

This application claims the benefit under 35 U.S.C. §119(a) of a Korean patent application filed in the Korean Intellectual Property Office on Oct. 18, 2007 and assigned Serial No. 2007-105287, a Korean patent application filed in the Korean Intellectual Property Office on Jan. 4, 2008 and assigned Serial No. 2008-1491, and a Korean patent application filed in the Korean Intellectual Property Office on Aug. 5, 2008 and assigned Serial No. 2008-76553, the entire disclosure of each of which are hereby incorporated by reference.

BACKGROUND OF THE INVENTION

1. Field of the Invention

The present invention relates to a method and apparatus for allocating resources in a wireless communication system. More particularly, the present invention relates to a method and apparatus for allocating resources in a communication system using a persistent resource allocation scheme.

2. Description of the Related Art

Next-generation communication systems are developing to provide various high-speed, high-capacity services to Mobile Stations (MSs). A next-generation communication system includes an Institute of Electrical and Electronics Engineers (IEEE) 802.16 communication system and a Mobile Worldwide Interoperability for Microwave Access (WiMAX) communication system. The Mobile WiMAX communication system is a communication system based on the IEEE 802.16 communication system.

With reference to FIG. 1, a description will now be made of a frame structure in an IEEE 802.16 communication system.

FIG. 1 is a diagram illustrating a frame structure in an IEEE 802.16 communication system.

As illustrated in FIG. 1, a frame 111 includes a DownLink (DL) subframe 113, a Transmit/Receive Transition Gap (TTG) interval 115, an UpLink (UL) subframe 117, and a Receive/Transmit Transition Gap (RTG) interval 119. A length of the frame 111 is $t_{frame}$, a length of the DL subframe 113 is $t_{DL\_subframe}$, a length of the TTG interval 115 is $t_{TTG}$, a length of the UL subframe 117 is $t_{UL\_subframe}$, and a length of the RTG interval 119 is $r_{RTG}$.

The DL subframe 113 includes a preamble region 121, a Frame Control Header (FCH) region 123, a DL_MAP region 125, a UL_MAP region 127, and a DL data burst region 129. A synchronization signal, e.g., preamble signal, for synchronization acquisition between a signal transmission apparatus, e.g., a Base Station (BS), and a signal reception apparatus, e.g., an MS, is transmitted during the preamble region 121. Basic information on subchannels, ranging and a modulation scheme is transmitted during the FCH region 123. A DL_MAP message is transmitted during the DL_MAP region 125, and a UL_MAP message is transmitted during the UL_MAP region 127. The DL_MAP message includes a DL_MAP Information Element (IE) indicating information about the DL data burst region 129. The UL_MAP message includes a UL_MAP IE indicating information about a UL data burst region 133. DL data bursts are transmitted during the DL data burst region 129.

The UL subframe 117 includes a control region 131 and the UL data burst region 133. Although not separately illustrated in FIG. 1, the control region 131 includes a ranging region, a Channel Quality Indicator Channel (CQ-ICH) region, an ACKnowledgment (ACK) channel (ACKCH) region, and a sounding region. The ranging region is a region during which an MS transmits a ranging code, and when performing an initial network entry operation, performing a handoff operation or requesting resource allocation, an MS transmits a ranging code through the ranging region according to its purpose. The CQICH region indicates a region during which an MS transmits its CQI, and the ACKCH region indicates a region during which an MS transmits its success/failure in reception of DL data bursts. A sounding signal for allowing an MS to perform UL channel estimation is transmitted during the sounding region.

As described in FIG. 1, the IEEE 802.16 communication system allocates resources to an MS to exchange DL and UL traffic data with it, and provides the resource allocation information to the MS using a resource allocation message. The resource allocation message can be a DL_MAP message or a UL_MAP message. A transmission period of the DL_MAP message and UL_MAP message is a frame period.

However, in the service where traffic data is periodically transmitted to an MS, for example, in Voice over Internet Protocol (VoIP) service, BS's transmitting a resource allocation message at every frame to transmit resource allocation information for the resources allocated to the corresponding MS may cause an unnecessary waste in resources. Therefore, when providing a service having a periodic traffic transmission period like the VoIP service, it is preferable to persistently allocate resources for the corresponding MS. A scheme of persistently allocating resources for a particular MS is referred to as a 'persistent resource allocation scheme'. For convenience, the persistent resource allocation scheme will be referred to herein as a 'circuit-mode resource allocation scheme'.

When using the circuit-mode resource allocation scheme, an MS, once it is allocated resources from a BS, can persistently use the allocated resources without receiving the resource allocation message at every frame. Of course, when the resource allocation for the MS is changed or released, the BS can notify the MS of the change and release of the resource allocation using a separate resource allocation message. As a result, when using the circuit-mode resource allocation scheme, the BS has no need to transmit the resource allocation message at every frame, thereby making it possible to prevent the waste of resources caused by the transmission of the resource allocation message.

With reference to FIG. 2, a description will now be made of a resource allocation method based on a circuit-mode resource allocation scheme in an IEEE 802.16 communication system.

FIG. 2 is a diagram schematically illustrating a resource allocation method based on a circuit-mode resource allocation scheme in an IEEE 802.16 communication system.

Before a description of FIG. 2 is given, it should be noted that the IEEE communication system uses two resource allocation schemes, namely a packet-mode resource allocation scheme and a circuit-mode resource allocation scheme. Referring to FIG. 2, both a resource allocation method based on the packet-mode resource allocation scheme and a resource allocation method based on the circuit-mode resource allocation scheme are illustrated. For convenience, however, a description of the resource allocation method based on the packet-mode resource allocation scheme will be omitted herein. For convenience, resources allocated using the circuit-mode resource allocation scheme will be referred to as 'circuit-mode resources'.

The slot numbers referred to herein and illustrated in FIGS. 2 and 3 are numbered separately for each of the packet-mode resource allocation scheme and the circuit-mode resource allocation scheme in order to simplify the explanation. The slot numbers for the packet-mode resource allocation scheme are numbered in the same direction as the resource allocation beginning with the first slot used for the packet-mode resource allocation scheme. The slot numbers for the circuit-mode resource allocation scheme are numbered in the opposite direction to the resource allocation beginning with the last slot used for the packet-mode resource allocation scheme. The slot numbers used herein are merely for the purpose of explanation and any other slot numbering scheme may equally be used, such as numbering all of the slots of a subframe. Further, the direction of the resource allocation is merely an example, as at least one of the packet-mode resource allocation scheme and circuit-mode resource allocation scheme may employ a resource allocation in a direction opposite to that described herein.

Referring to FIG. 2, when resources are allocated for UL data bursts included in a UL subframe using the circuit-mode resource allocation scheme, UL resources are allocated slot by slot beginning from a start offset. The start offset indicates a location from which the BS starts allocating UL resources using the circuit-mode resource allocation scheme, and a slot #10 is assumed to be the start offset in FIG. 2. A detailed description of the start offset will be given below.

For example, in FIG. 2, a circuit-mode resource #1 includes 2 slots in the forward direction from slot #10 which in this example is the start offset, a circuit-mode resource #2 includes 2 slots in the forward direction from slot #8 which is the next slot of the slots included in the circuit-mode resource #1, and a circuit-mode resource #3 includes 6 slots in the forward direction from slot #6 which is the next slot of the slots included in the circuit-mode resource #2.

However, the use of the circuit-mode resource allocation scheme described in FIG. 2 may cause a reduction in resource efficiency, which will be described with reference to FIG. 3.

FIG. 3 is a diagram illustrating a case where a circuit-mode resource is de-allocated in an IEEE 802.16 communication system.

Referring to FIG. 3, it is assumed that the circuit-mode resource #2 among the 3 circuit-mode resources allocated in FIG. 2 is de-allocated. It is also assumed that after the circuit-mode resource #2 is de-allocated, a circuit-mode resource #4, or a new circuit-mode resource, may be allocated. The number of slots included in the circuit-mode resource #4 is assumed to be 4. In this case, the number of slots included in the circuit-mode resource #4 exceeds the number 2 of slots included in the de-allocated circuit-mode resource #2. Therefore, the circuit-mode resource #4 cannot use the slots which were included in the circuit-mode resource #2, and should therefore include 4 new slots following the circuit-mode resource #3 that as illustrated in FIG. 3 would comprise larger slot numbers than the start offset. The slots included in the circuit-mode resource #4 include 4 slots in the forward direction from slot #14, which is the new start offset. As a result, the 2 slots of a slot #8 and a slot #7, which were include in the de-allocated circuit-mode resource #2, become a hole, and the hole is an unavailable resource.

As described in FIG. 3, the use of the circuit-mode resource allocation scheme may cause creation of the hole, impeding continuity of resource allocation. The creation of the hole reduces the resource efficiency, resulting in a decrease in efficiency of the IEEE 802.16 communication system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allocating resources in a wireless communication system.

Another aspect of the present invention is to provide a method and apparatus for allocating resources to prevent the creation of a hole when a circuit-mode resource allocation scheme is used in a wireless communication system.

According to one aspect of the present invention, a method for allocating resources by a Base Station (BS) in a wireless communication system is provided. The method includes determining use/nonuse of each of a plurality of Resource Blocks (RBs), which are allocated using a persistent allocation scheme, and transmitting resource allocation information indicating use/nonuse of each of the plurality of RBs to a plurality of Mobile Stations (MSs) according to a result of the determination.

According to another aspect of the present invention, a method for allocating resources by a Mobile Station (MS) in a wireless communication system is provided. The method includes receiving resource allocation information indicating use/nonuse of each of a plurality of Resource Blocks (RBs), which are allocated by a Base Station (BS) using a persistent allocation scheme, and using an RB allocated to an MS itself according to the resource allocation information.

According to further another aspect of the present invention, a Base Station (BS) apparatus in a wireless communication system is provided. The apparatus includes a controller for determining use/nonuse of each of a plurality of Resource Blocks (RBs), which are allocated using a persistent allocation scheme, and generating resource allocation information indicating use/nonuse of each of the plurality of RBs according to a result of the determination, and a transmitter for transmitting the resource allocation information to a plurality of Mobile Stations (MSs).

According to still another aspect of the present invention, a Mobile Station (MS) apparatus in a wireless communication system is provided. The apparatus includes a receiver for receiving resource allocation information indicating use/nonuse of each of a plurality of Resource Blocks (RBs), which are allocated by a Base Station (BS) using a persistent allocation scheme, and a controller for using an RB allocated to an MS itself according to the resource allocation information.

According to still another aspect of the present invention, a method for allocating resources by a Base Station (BS) in a wireless communication system is provided. The method includes persistently allocating one or more resource slots among a plurality of resource slots, the persistently allocated one or more resource slots being allocated to corresponding one or more Mobile Stations (MSs), de-allocating at least one persistently allocated resource slot of the one or more persistently allocated resource slots, determining whether a hole is created due to the de-allocation among the one or more persistently allocated resource slots not de-allocated, and shifting a location of at least one of the one or more non-de-allocated persistently allocated resource slots when it is determined that the hole is created due to the de-allocation.

According to still another aspect of the present invention, a method for allocating resources by a Mobile Station (MS) in a wireless communication system is provided. The method includes receiving a resource allocation message used for persistently allocating at least one resource slot, receiving a message including de-allocation information of at least one resource slot, determining whether a hole is created among one or more persistently allocated resource slots according to the received de-allocation information, when the hole is created, determining whether to shift a location of at least one resource slot persistently allocated to the MS, shifting the location of the at least one persistently allocated resource slot when it is determined to shift the location.

According to still another aspect of the present invention, a method for allocating resources in a wireless communication system is provided. The method includes persistently allocating, by a Base Station (BS), one or more resource slots among a plurality of resource slots, the persistently allocated one or more resource slots being allocated to corresponding one or more Mobile Stations (MSs), and transmitting, to one or more MSs, a resource allocation message for persistently allocating the one or more resource slots, receiving, by the one or more MSs, the resource allocation message, de-allocating, by the BS, at least one persistently allocated resource slot of the one or more persistently allocated resource slots, and transmitting, to at least one of the one or more MSs, a message including de-allocation information of the at least one de-allocated resource slot, receiving, by the at least one MS, the message, determining, by the BS, whether a hole is created due to the de-allocation among the one or more persistently allocated resource slots not de-allocated, shifting, by the BS, a location of at least one of the one or more non-de-allocated persistently allocated resource slots when it is determined that the hole is created due to the de-allocation, determining, by each of the at least one MS, whether the hole is created among the one or more non-de-allocated persistently allocated resource slots according to the received de-allocation information, determining, by each of the at least one MS, whether to shift a location of at least one resource slot persistently allocated to itself, when the hole is determined to be created according to the received de-allocation information, and shifting, by each of the at least one MS, the location of its at least one persistently allocated resource slot, when the location is determined to be shifted.

According to still another aspect of the present invention, a Base Station (BS) apparatus in a wireless communication system is provided. The apparatus includes a controller for persistently allocating one or more resource slots among a plurality of resource slots, the persistently allocated one or more resource slots being allocated to corresponding one or more Mobile Stations (MSs), for de-allocating at least one persistently allocated resource slot of the one or more persistently allocated resource slots, for determining whether a hole is created due to the de-allocation among the one or more persistently allocated resource slots not de-allocated, and for shifting a location of at least one of the one or more non-de-allocated persistently allocated resource slots when it is determined that the hole is created due to the de-allocation.

According to still another aspect of the present invention, a Mobile Station (MS) apparatus in a wireless communication system is provided. The apparatus includes a receiver for receiving a resource allocation message used for persistently allocating at least one resource slot, and for receiving a message including de-allocation information of at least one resource slot, and a controller for determining whether a hole is created among one or more persistently allocated resource slots according to the received de-allocation information, for determining whether to shift a location of at least one resource slot persistently allocated to the MS, when the hole is created, and for shifting the location of the at least one persistently allocated resource slot when it is determined to shift the location.

According to still another aspect of the present invention, a wireless communication system is provided. The system includes a Base Station (BS) for persistently allocating one or more resource slots among a plurality of resource slots, the persistently allocated one or more resource slots being allocated to corresponding one or more Mobile Stations (MSs), for transmitting, to the one or more MSs, a resource allocation message for persistently allocating the one or more resource slots, for de-allocating at least one persistently allocated resource slot of the one or more persistently allocated resource slots, for transmitting, to at least one of the one or more MSs, a message including de-allocation information of the at least one de-allocated resource slot, for determining whether a hole is created due to the de-allocation among the one or more persistently allocated resource slots not de-allocated, and for shifting a location of at least one of the one or more non-de-allocated persistently allocated resource slots when it is determined that the hole is created due to the de-allocation, and the one or more MSs, each for receiving the resource allocation message, for receiving the message, for determining whether the hole is created among the one or more non-de-allocated persistently allocated resource slots according to the received de-allocation information, for determining whether to shift a location of at least one resource slot persistently allocated to itself, when the hole is determined to be created according to the received de-allocation information, and for shifting the location of its at least one persistently allocated resource slot, when the location is determined to be shifted.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Therefore, a need exists for an improved image forming apparatus capable of double-sided printing with one printing module.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and apparatus for allocating resources in a wireless communication system. Further, exemplary embodiments of the present invention provide a resource allocation method and apparatus for increasing resource efficiency by allocating resources to prevent creation of a hole(s) when a persistent resource allocation scheme is used as a resource allocation scheme in a wireless communication system. For convenience, the persistent resource allocation scheme will be referred to as a 'circuit-mode resource allocation scheme'. Although an Institute of Electrical and Electronics Engineers (IEEE) 802.16 communication system will be described herein as an example of a wireless communication system, the resource allocation method and apparatus proposed by exemplary embodiments of the present invention can be used not only in the IEEE 802.16 communication system, but also in other wireless communication systems such as a Mobile Worldwide Interoperability for Microwave Access (WiMAX) communication system.

The slot numbers referred to herein and illustrated in FIGS. 4-8 are numbered separately for each of the packet-mode resource allocation scheme and the circuit-mode resource allocation scheme in order to simplify the explanation. The slot numbers for the packet-mode resource allocation scheme are numbered in the same direction as the resource allocation beginning with the first slot used for the packet-mode resource allocation scheme. The slot numbers for the circuit-mode resource allocation scheme are numbered in the opposite direction to the resource allocation beginning with the last slot used for the packet-mode resource allocation scheme. The slot numbers used herein are merely for the purpose of explanation and any other slot numbering scheme may equally be used, such as numbering all of the slots of a subframe. Further, the direction of the resource allocation is merely an example, as at least one of the packet-mode resource allocation scheme and circuit-mode resource allocation scheme may employ a resource allocation in a direction opposite to that described herein.

Figure 1:
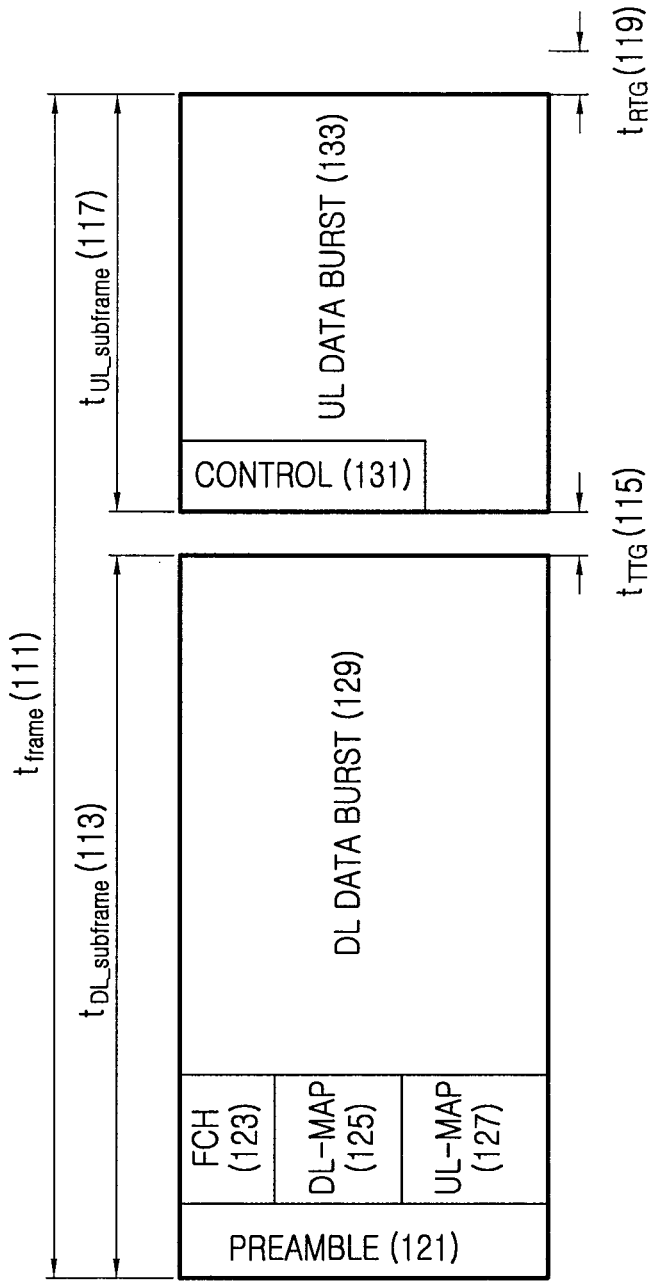
FIG. 1 is a diagram illustrating a frame structure in an IEEE 802.16 communication system.
Figure 2:
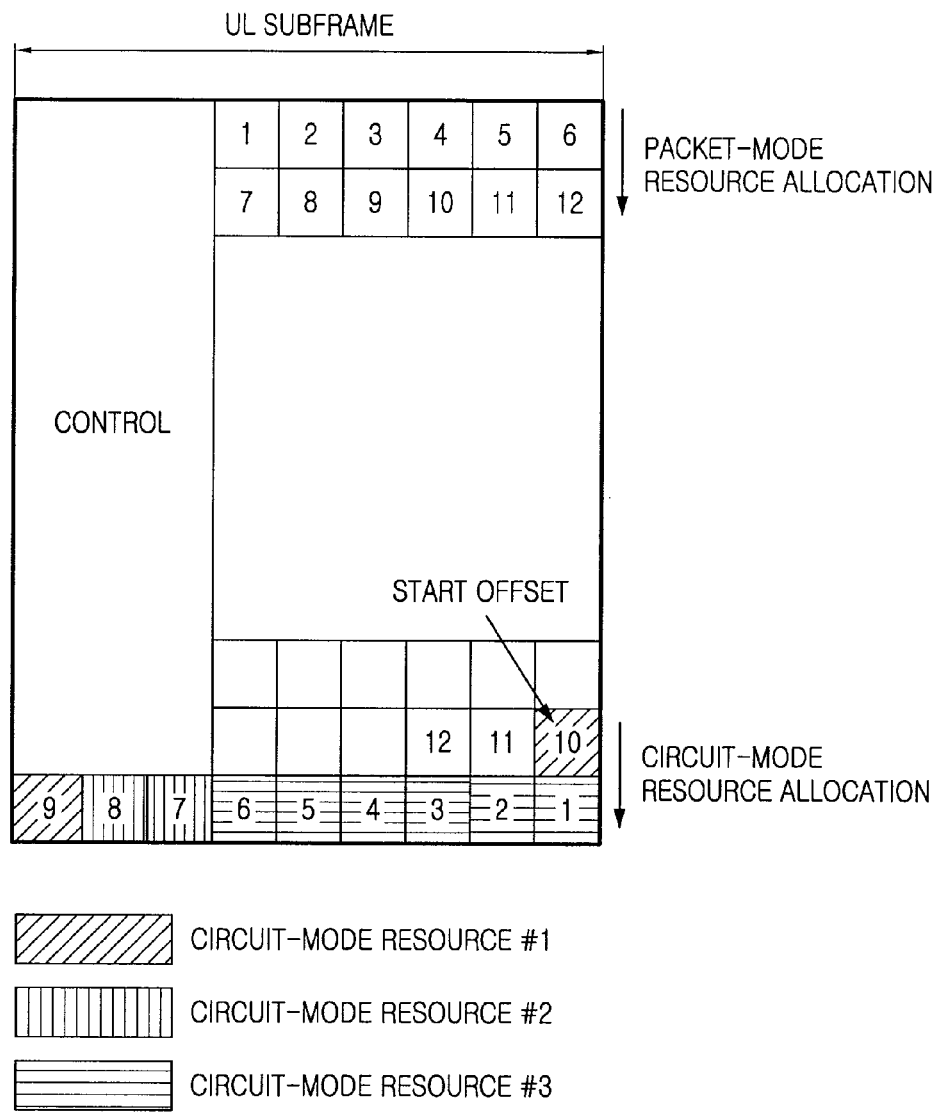
FIG. 2 is a diagram schematically illustrating a resource allocation method based on a circuit-mode resource allocation scheme in an IEEE 802.16 communication system.
Figure 3:
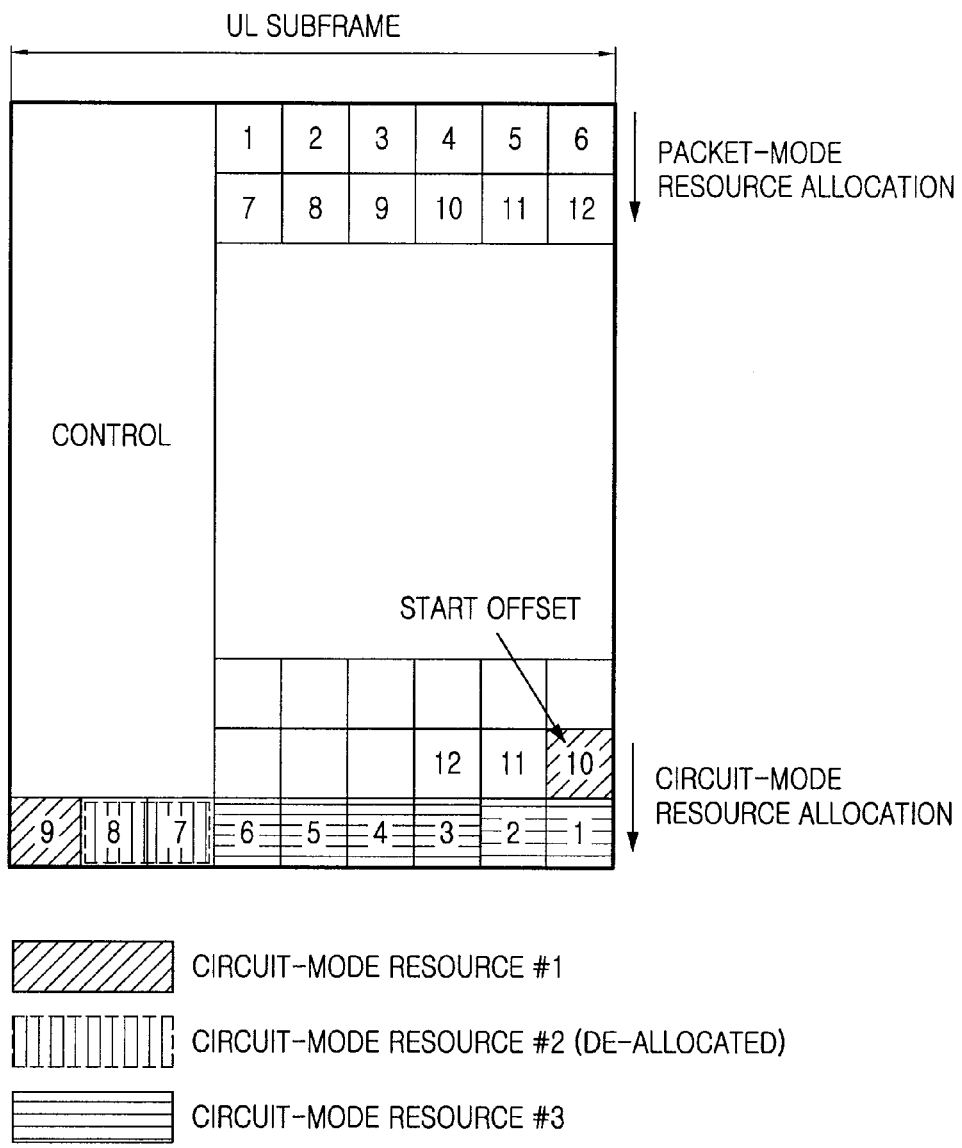
FIG. 3 is a diagram illustrating a case where a circuit-mode resource is de-allocated in an IEEE 802.16 communication system.
Figure 4:
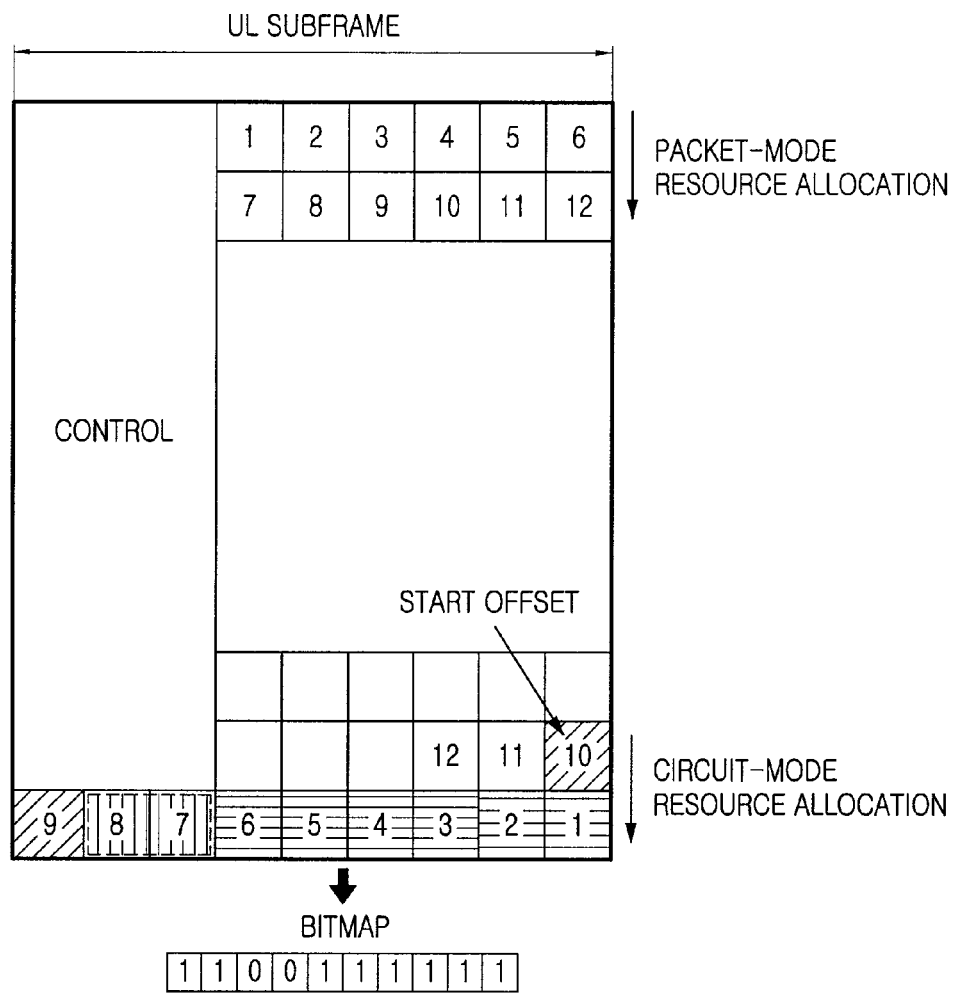
FIG. 4 is a diagram schematically illustrating an example of a resource allocation method based on a circuit-mode resource allocation scheme in an IEEE 802.16 communication system according to an exemplary embodiment of the present invention.

FIG. 4 is a diagram schematically illustrating an example of a resource allocation method based on a circuit-mode resource allocation scheme in an IEEE 802.16 communication system according to an exemplary embodiment of the present invention.

Before a description of FIG. 4 is given, it should be noted that the IEEE 802.16 communication system uses two resource allocation schemes, namely a packet-mode resource allocation scheme and a circuit-mode resource allocation scheme. Referring to FIG. 4, both a resource allocation method based on the packet-mode resource allocation scheme and a resource allocation method based on the circuit-mode resource allocation scheme are illustrated. For convenience, however, a description of the resource allocation method based on the packet-mode resource allocation scheme will be omitted herein, since it is not directly related to the present invention. For convenience, resources allocated using the circuit-mode resource allocation scheme will be referred to as 'circuit-mode resources', and the minimum allocation unit of resources allocated using the circuit-mode resource allocation scheme will be assumed to be referred to as a slot.

Referring to FIG. 4, it will be assumed that a total of 2 circuit-mode resources, i.e., a circuit-mode resource #1 and a circuit-mode resource #3, are allocated and one circuit-mode resource, i.e., a circuit-mode resource #2, is de-allocated in a UpLink (UL) data burst region included in a UL subframe. Referring to FIG. 4, a start offset is slot #10, and the start offset indicates a location from which a BS starts allocating UL resources using the circuit-mode resource allocation scheme. A detailed description of the start offset will be given below. When resources are allocated using the circuit-mode resource allocation scheme as illustrated in FIG. 4, slots included in the de-allocated resource become a hole, and the hole becomes unavailable resources, causing a reduction in the resource efficiency.

Therefore, exemplary embodiments of the present invention propose a new resource allocation method for using the hole, and the resource allocation method provides resource allocation information for the resources allocated using the circuit-mode resource allocation scheme in the form of a bitmap. A detailed description thereof will be given below.

A Base Station (BS) generates a bitmap in the minimum allocation unit for the resources allocated using the circuit-mode resource allocation scheme. For example, as shown in FIG. 4, when the resources allocated using the circuit-mode resource allocation scheme include a total of 10 slots of slot #10 to slot #1, the BS generates a bitmap so that it can indicate whether each slot, which is the minimum allocation unit, is allocated. In order to indicate a total of 10 slots, a bitmap includes a total of 10 bits, and the 10 bits are one-to-one mapped to the 10 slots. When the value of a bit of the bitmap is, for example, '1', it indicates that the corresponding slot is allocated, and when its value is, for example, '0', it indicates that the corresponding slot is not allocated.

In FIG. 4, since the circuit-mode resource #3 and the circuit-mode resource #1 are allocated and the circuit-mode resource #2 is de-allocated, the BS generates a bitmap of [1100111111]. The BS transmits the generated bitmap through a resource allocation message, e.g., a UL_MAP message. In the exemplary case of FIG. 4, since resources are allocated for a UL subframe using the circuit-mode resource allocation scheme, the resource allocation message is a UL_MAP message. In the case where resources are allocated for a DownLink (DL) subframe using the circuit-mode resource allocation scheme, the resource allocation message is a DL_MAP message. A detailed description of the resource allocation message including the bitmap will be given below.

When the BS transmits the resource allocation message including the bitmap, Mobile Stations (MSs), which have been allocated resources using the circuit-mode resource allocation scheme, receive the resource allocation message, and detect the bitmap from the resource allocation message. Further, the MSs each check the location of slot(s) allocated thereto from the bitmap, and also check the location of the de-allocated slot(s).

Each MS, when circuit-mode resources allocated to the MS itself are located in front of the de-allocated slots, detects the number of the de-allocated slots, and shifts the location of the slots included in the circuit-mode resource allocated thereto. A description thereof will be made with reference to FIG. 5.

Figure 5:
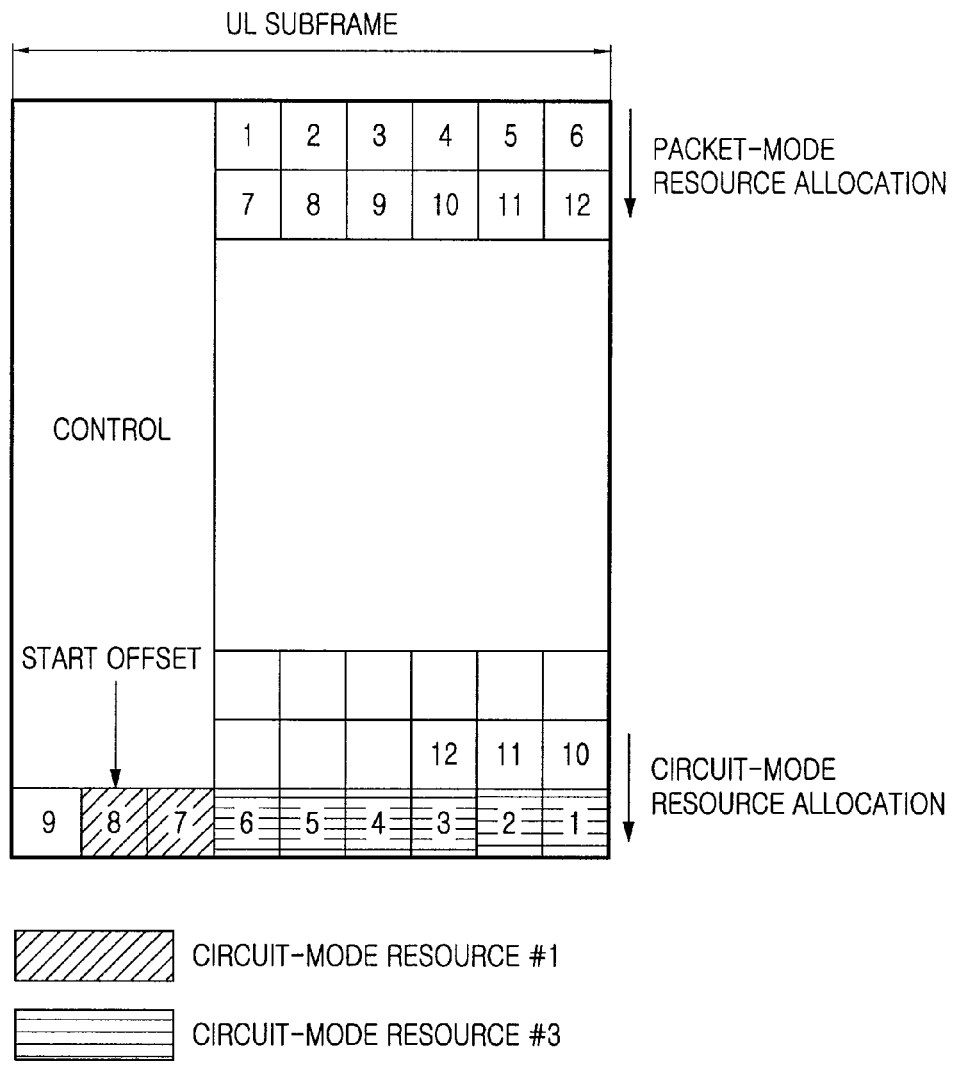
FIG. 5 is a diagram illustrating a method in which MSs, which have received a bitmap, re-set a location of slots included in circuit-mode resources according to the bitmap, according to an exemplary embodiment of the present invention.

FIG. 5 is a diagram illustrating a method in which MSs, which have received a bitmap, re-set a location of slots included in circuit-mode resources according to the bitmap, according to an exemplary embodiment of the present invention.

Referring to FIG. 5, since the bitmap of FIG. 4 indicates de-allocation of the circuit-mode resource #2, the circuit-mode resource #1, which is a circuit-mode resource located in front of the de-allocated circuit-mode resource #2, should be shifted by the number 2 of slots included in the de-allocated circuit-mode resource #2. Therefore, an MS, which is allocated the circuit-mode resource #1, changes the location of the slots included in the circuit-mode resource #1 so that the circuit-mode resource #1 includes 2 slots in the forward direction from slot #8 rather than slot #10. Since the location of the circuit-mode resource #1 is changed in this way, the start offset is also changed from slot #10 to slot #8. It will be assumed herein that the location change based on the bitmap is performed after a defined number of frames have elapsed from the frame where the bitmap was transmitted.

Meanwhile, as described in FIG. 5, it will be assumed that after the de-allocated circuit-mode resources are used, a circuit-mode resource #4, or a new circuit-mode resource, may be allocated. The number of slots included in the circuit-mode resource #4 is assumed to be 4. In this case, since the circuit-mode resource #4 is a new circuit-mode resource that is different from the previously allocated circuit-mode resources, the BS should notify of the start offset and the slot length to the MS using a resource allocation message. A description thereof will be given with reference to FIG. 6.

Figure 6:
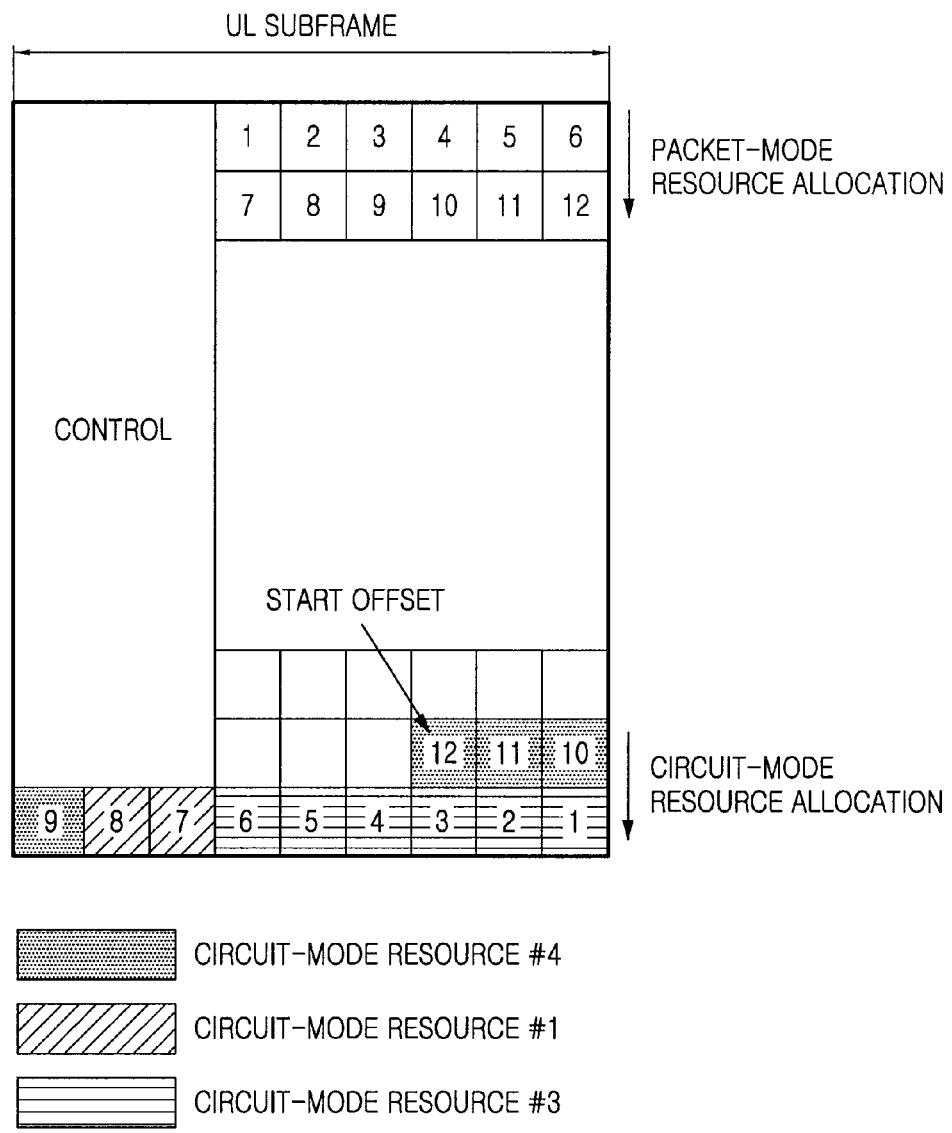
FIG. 6 is a diagram illustrating a method in which MSs, which have received a bitmap, re-set a location of slots included in a circuit-mode resource according to the bitmap, and then allocate a new circuit-mode resource, according to an exemplary embodiment of the present invention.

FIG. 6 is a diagram illustrating a method in which MSs, which have received a bitmap, re-set a location of slots included in circuit-mode resources according to the bitmap, and then allocate a new circuit-mode resource, according to an exemplary embodiment of the present invention.

As illustrated in FIG. 6, a BS can allocate the new circuit-mode resource #4 by setting a start offset to slot #12 and transmitting a length 4 of the circuit-mode resource #4 along with information on the set start offset.

With reference to FIGS. 4 to 6, the resource allocation method based on the circuit-mode resource allocation scheme has been described on the assumption that the IEEE 802.16 communication system first allocates packet-mode resources using the packet-mode resource allocation scheme, and then allocates circuit-mode resources using the circuit-mode resource allocation scheme. However, the same is possible even for the case where the IEEE 802.16 communication system first allocates circuit-mode resources using the circuit-mode resource allocation scheme, and then allocates packet-mode resources using the packet-mode resource allocation scheme. A description thereof will be given below with reference to FIGS. 7 and 8.

Figure 7:
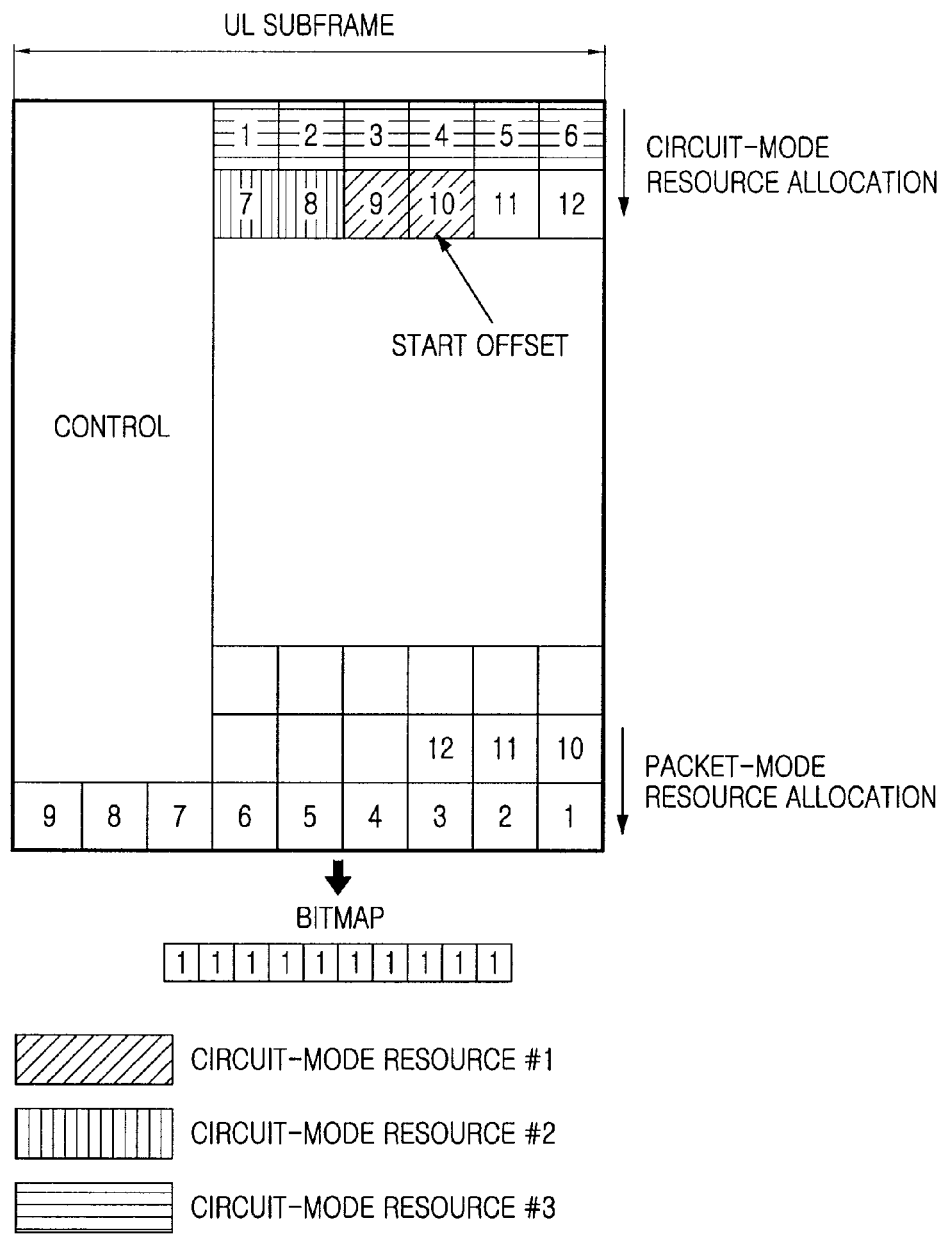
FIG. 7 is a diagram schematically illustrating an example of a resource allocation method based on a circuit-mode resource allocation scheme in an IEEE 802.16 communication system according to an exemplary embodiment of the present invention.

FIG. 7 is a diagram schematically illustrating an example of a resource allocation method based on a circuit-mode resource allocation scheme in an IEEE 802.16 communication system according to an exemplary embodiment of the present invention.

Shown in FIG. 7, unlike that in FIG. 4, is a method for first allocating circuit-mode resources using the circuit-mode resource allocation scheme, and then allocating packet-mode resources using the packet-mode resource allocation scheme in the IEEE 802.16 communication system. In this case, the forward direction for allocation of the circuit-mode resources is the opposite direction compared with the case where the packet-mode resource allocation is first performed, and when the circuit-mode resource allocation is first performed, the resources are allocated considering a Modulation and Coding Scheme (MCS) level. That is, an MS that uses the circuit-mode resource #3 among the circuit-mode resources shown in FIG. 7 has the lowest MCS level, and an MS that uses the circuit-mode resource #1 has the highest MCS level.

Figure 8:
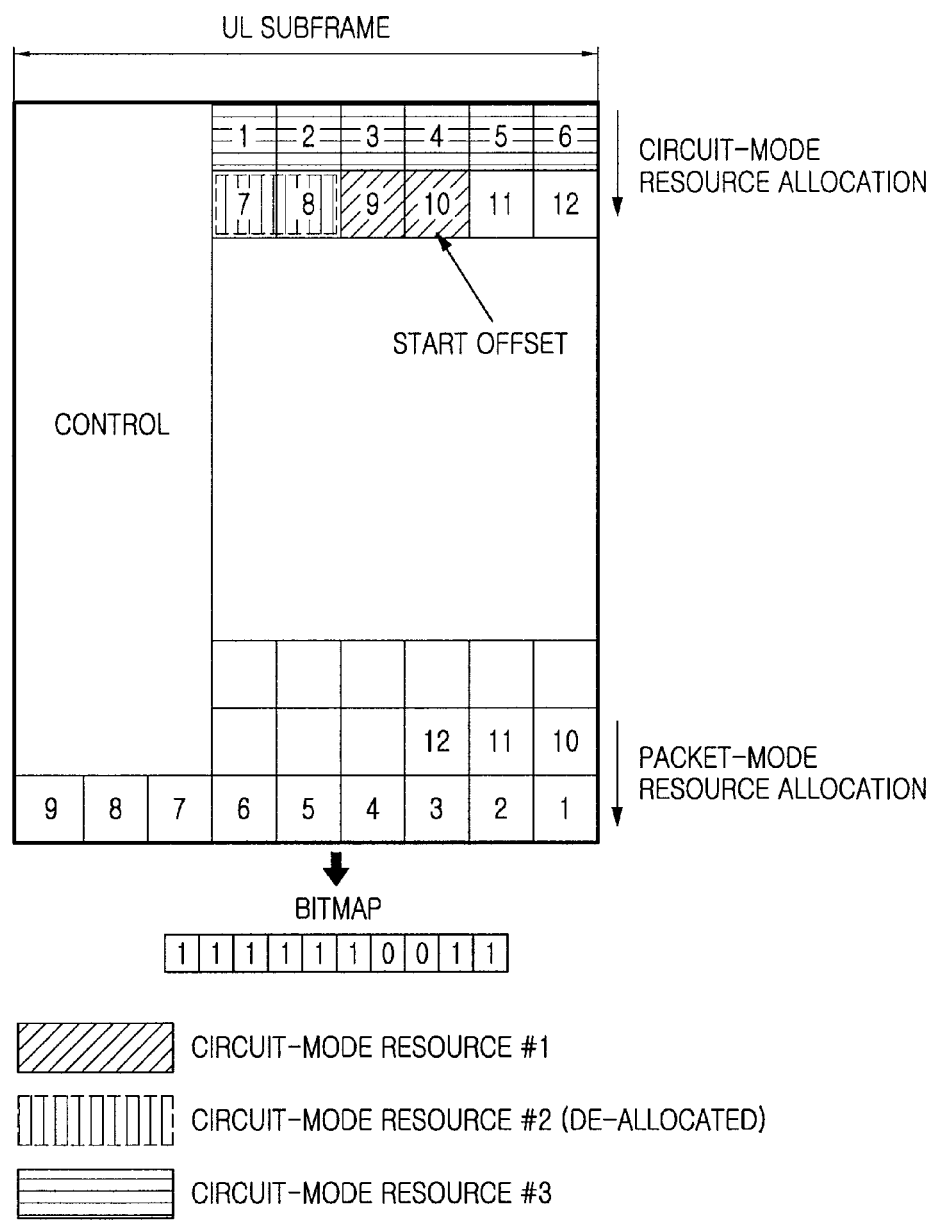
FIG. 8 is a diagram illustrating a case where a circuit-mode resource is de-allocated, according to an exemplary embodiment of the present invention.

FIG. 8 is a diagram illustrating a case where a circuit-mode resource is de-allocated, according to an exemplary embodiment of the present invention.

Referring to FIG. 8, it will be assumed that the circuit-mode resource #2 among the 3 circuit-mode resources allocated in FIG. 7 is de-allocated. That is, since the circuit-mode resource #3 and the circuit-mode resource #1 are allocated and the circuit-mode resource #2 is de-allocated, the BS generates a bitmap of [1111110011]. As illustrated in FIG. 8, since the forward direction for allocation of the circuit-mode resources is the opposite direction compared with the case where the packet-mode resource allocation is first performed, the bitmap is different. Since the bitmap of FIG. 8 indicates de-allocation of the circuit-mode resource #2, the circuit-mode resource #1, which is a circuit-mode resource located behind the de-allocated circuit-mode resource #2, should be shifted by the number 2 of slots included in the de-allocated circuit-mode resource #2. Therefore, an MS, which is allocated the circuit-mode resource #1, changes the location of slots included in the circuit-mode resource #1 so that the circuit-mode resource #1 includes 2 slots in the forward direction from slot #8 rather than slot #10. It will be assumed herein that the location change based on the bitmap is performed after a defined number of frames have elapsed from the frame where the bitmap was transmitted. In FIG. 8, when the circuit-mode resource allocated to a corresponding MS exists in front of the de-allocated circuit-mode resource, the corresponding MS uses the intact circuit-mode resource allocated to the MS.

With reference to Table 1, a description will now be made of a UL circuit-mode resource allocation message, or a UL Persistent Allocation IE.

TABLE 1

| Fields | Description |
| --- | --- |
| UL Persistent Allocation_IE( ) { | |
| Extended-2 UIUC | |
| Length | |
| UL Persistent Allocation IE | 0x01 |
| Used Resource Bitmap size | Length in bytes of Used Resource Bitmap |
| Used Resource Bitmap | UL Used Resource Bitmap |
| Number of slot per bit | Number of slots included in 1 bit of bitmap |
| Burst level start offset | |
| if(Burst level start offset==1){ | |
| Start offset | |
| } | |
| N_Burst | Number of UL circuit-mode control messages |
| For(i=0; i<N_Burst; i++) { | |
| UL Persistent Allocation subburst IE | |
| .. | |
| } | |
| } | |

Before a description of Table 1 is given, it should be noted that in the IEEE 802.16 communication system, since circuit-mode resources are allocated in the UL in a one-dimensional manner, the UL Persistent Allocation_IE has no need to separately include a Region Identifier (ID), or region size/location information.

In Table 1, Extended-2 Uplink Interval Usage Code (UIUC) indicates Extended-2 UIUC of the UL Persistent Allocation_IE, and Length indicates a length of the UL Persistent Allocation_IE. Further, Burst level start offset is used for setting a start offset in front of a UL Persistent Allocation subburst IE in order to express the subburst to be allocated next, in duration. That is, Burst level start offset indicates if the UL Persistent Allocation_IE includes a Start offset of a subburst corresponding to the UL Persistent Allocation subburst IE included in the UL Persistent Allocation_IE. For example, if the Burst level start offset is set to a defined value, for example, 1, it indicates that the UL Persistent Allocation_IE includes a Start offset just after the Burst level start offset.

The Start offset, as described above, indicates a location from which circuit-mode resource allocation is started. Since circuit-mode resources are allocated in the UL in a one-dimensional manner, the Start offset can be represented in a one-dimensional manner, or can be represented using Orthogonal Frequency Division Multiple Access (OFDMA) symbol location and subchannel location. For convenience, it is assumed herein that the start offset is represented by the location of a slot. Unlike the foregoing description, it is also possible to notify of the Start offset by transmitting a UL Allocation start IE before transmitting the UL Persistent Allocation_IE.

In Table 1, a Used Resource Bitmap Size field indicates a size in bytes of a used resource bitmap, and a Used Resource Bitmap field indicates a used resource bitmap indicating if the actual circuit-mode resource is allocated or de-allocated. A Number of slots per bit field indicates the number of slots indicated by each bit in the used resource bitmap. For convenience, although it is assumed herein that each bit in the used resource bitmap indicates whether one slot is de-allocated or not, each bit can also indicate whether more than two slots are de-allocated or not. When each bit in the used resource bitmap indicates whether one slot is de-allocated or not (i.e., whether one slot is used or not), it is possible to correctly indicate use/nonuse of resources on a slot-by-slot basis. In this case, however, it may be necessary to transmit a used resource bitmap of a larger size compared with the case where each bit indicates whether more than two slots are used or not. Therefore, the number of slots indicated by each bit in the used resource bitmap should be selected suitable for the system condition.

Further, in Table 1, an N_Burst field indicates the number of UL Persistent Allocation subburst IEs included in the UL Persistent Allocation_IE. The UL Persistent Allocation subburst IE is a sub resource allocation message for controlling all circuit-mode resource allocation operations of allocating resources to MSs using the circuit-mode resource allocation scheme, de-allocating the circuit-mode resources allocated to the MSs, and changing the circuit-mode resources allocated to the MSs.

A format of the UL Persistent Allocation subburst IE can be made as shown in Table 2. It should be noted in Table 2 that the UL Persistent Allocation subburst IE is written as UL Persistent HARQ chase_Subburst_IE.

TABLE 2

| Fields | Length (bits) | Description |
|---|---|---|
| UL Persistent HARQ chase_Subburst_IE( ) { | | |
| RCID IE | | |
| Allocation Flag | | 0: New Resource Assignment |
| | | 1: Resource Release |
| Dedicated UL Control Indicator | 1 | |
| if (Dedicated UL Control Indicator==1){ | | |
| Dedicated UL Control IE | | |
| } | | |
| if (burst level start offset==0){ | | |
| Subburst level start offset | | Start offset for current Subburst, when burst level start offset == 1, start offset for each subburst is referred from the end of the previously allocated subburst |
| } | | |
| Duration | | Allocation duration |
| Period | | Allocation Period |
| Expire | | Allocation Expire |
| Start ACID | | Start ACID |
| # of ACID | | Number of ACID |
| UIUC | | |
| Repetition | | |
| CQI Report flag | 1 | 1: CQI Report through UL subburst |
| if(CQI Report flag==1){ | | |
| period | | Reporting period |
| Frame offset | | |
| } | | |
| ACKdisable | 1 | |
| if (ACKdisable==0){ | | |
| ..DL ACK bitmap index | | |
| } | | |
| } | | |

As described above, it is possible to change the location of circuit-mode resources allocated to a corresponding MS taking the location of the de-allocated circuit-mode resource into account, using the used resource bitmap. However, even though the BS does not transmit the used resource bitmap, when the UL Persistent Allocation IE shown in Table 2 is received, it is possible to change the location of circuit-mode resources allocated to a corresponding MS. A detailed description thereof is given below.

The UL Persistent Allocation subburst IE includes an Allocation Flag field as shown in Table 2, and the Allocation Flag field indicates resource allocation or resource de-allocation according to its field value. Therefore, in order to de-allocate the previously allocated resources, the BS sets a field value of the Allocation Flag field to '0' indicating resource de-allocation, and transmits the UL Persistent Allocation subburst IE. In this case, each of the remaining MSs except for the MS whose resource(s) is de-allocated, detects the location of the de-allocated resource(s), and detects the location of the resource(s) allocated thereto. A detailed description thereof is given below.

All MSs can detect the location of the de-allocated resource(s) by receiving the transmitted UL Persistent Allocation subburst IE targeting other MSs except for themselves. When the de-allocated resource(s) is located behind the resource(s) allocated to an MS itself, the MS shifts back the location of the resource(s) allocated to itself by the size of the de-allocated resource. That is, for a particular MS, the UL Persistent Allocation subburst IE being transmitted to other MSs is used to resource shift information for the resource(s) allocated to the MS itself, and a description thereof will be given below with reference to FIGS. 4 and 5.

Assume that in the state where a slot #7 and a slot #8 are allocated to an MS #1, a BS transmits a UL Persistent allocation Subburst IE in order to de-allocate slot #7 and slot #8. In this case, an MS #2 using slot #9 and slot #10 can detect the de-allocation of slot #7 and slot #8 by receiving the UL Persistent allocation Subburst IE. Determining that the de-allocated slot #7 and slot #8 are located behind the resources of slot #9 and slot #10 used by the MS #2 itself, the MS #2 shifts back the location of its resources by 2 slots which is a size of the de-allocated resources, and uses slot #7 and slot #8.

Two exemplary embodiments have been described to prevent the creation of unused resources due to the resource de-allocation. These can be summarized below.

In a first exemplary embodiment, the BS informs all MSs of the used resources and the unused resources using the used resource bitmap, and all the MSs determine whether to shift the location of the resources allocated to MSs themselves using the used resource bitmap. In the first exemplary embodiment, the BS can prevent the unused resources from creating due to the resource de-allocation by transmitting the used resource bitmap when necessary, and the MS determines whether to shift the location of the resource used by the MS itself only when it receives the used resource bitmap. The transmission of the used resource bitmap by the BS can be performed when the BS determines that the transmission is needed, or can be performed at stated or variable periods. In determining whether to transmit the used resource bitmap, the BS can consider, for example, the number of created holes or the number of resources that cannot be substantially used due to the creation of the holes. For example, when the number of created holes or the number of resources that cannot be substantially used due to the creation of the holes is greater than or equal to a threshold number, the BS can determine whether to generate/transmit the used resource bitmap.

In an exemplary second embodiment, all MSs receive the transmitted resource de-allocation information, or UL Persistent Allocation subburst IE, targeting other MSs except for themselves, compare the location of the resources allocated thereto with the location of the de-allocated resource, and determine whether to shift the location of the resources allocated thereto by the size of the de-allocated resource depending on the comparison results. In the second exemplary embodiment, all MSs determine whether to shift the location of the resources used by themselves every time they receive the UL Persistent Allocation subburst IE.

Although the two exemplary embodiments for preventing the creation of the unused resources due to the resource de-allocation have been described for the UL, by way of example, the same can be applied to the DL. For example, when using Hybrid Automatic Repeat Request (HARQ) in the DL, the BS allocates an HARQ region, and performs one-dimensional resource allocation in the HARQ region similar to the resource allocation for the UL. That is, the BS allocates resources in the HARQ region in ascending order of their frequency indexes, and when the HARQ region reaches the boundary with another region, the BS increases the time, and allocates the resources beginning at the frequency resource having the minimum frequency index at the increased time resource region. When one-dimensional resource allocation is performed as described above, the foregoing two embodiments can be applied in the same way.

Meanwhile, in order to indicate allocation/non-allocation of a plurality of Resource Blocks (RBs) using the used resource bitmap as described in the first exemplary embodiment, it is necessary for the used resource bitmap to include at least RB bits. Herein, the RB, a kind of resource allocation unit, can be, for example, a slot, and when the number of RBs is n, the used resource bitmap should include at least n bits. For example, in an IEEE 802.16e communication system, one of the IEEE 802.16 communication systems, one DL subframe includes 300 slots or more, and in this case, the used resource bitmap should include at least 300 bits in order to indicate allocation/non-allocation of the 300 slots or more.

Therefore, in order to shift the location of the circuit-mode resources using the used resource bitmap, a frame structure using a smallest number of RBs is efficient. An IEEE 802.16m communication system, another one of the IEEE 802.16 communication systems, supports a frame structure that uses a lesser number of RBs, and the frame structure of the IEEE 802.16m communication system will be described with reference to FIG. 9.

Figure 9:
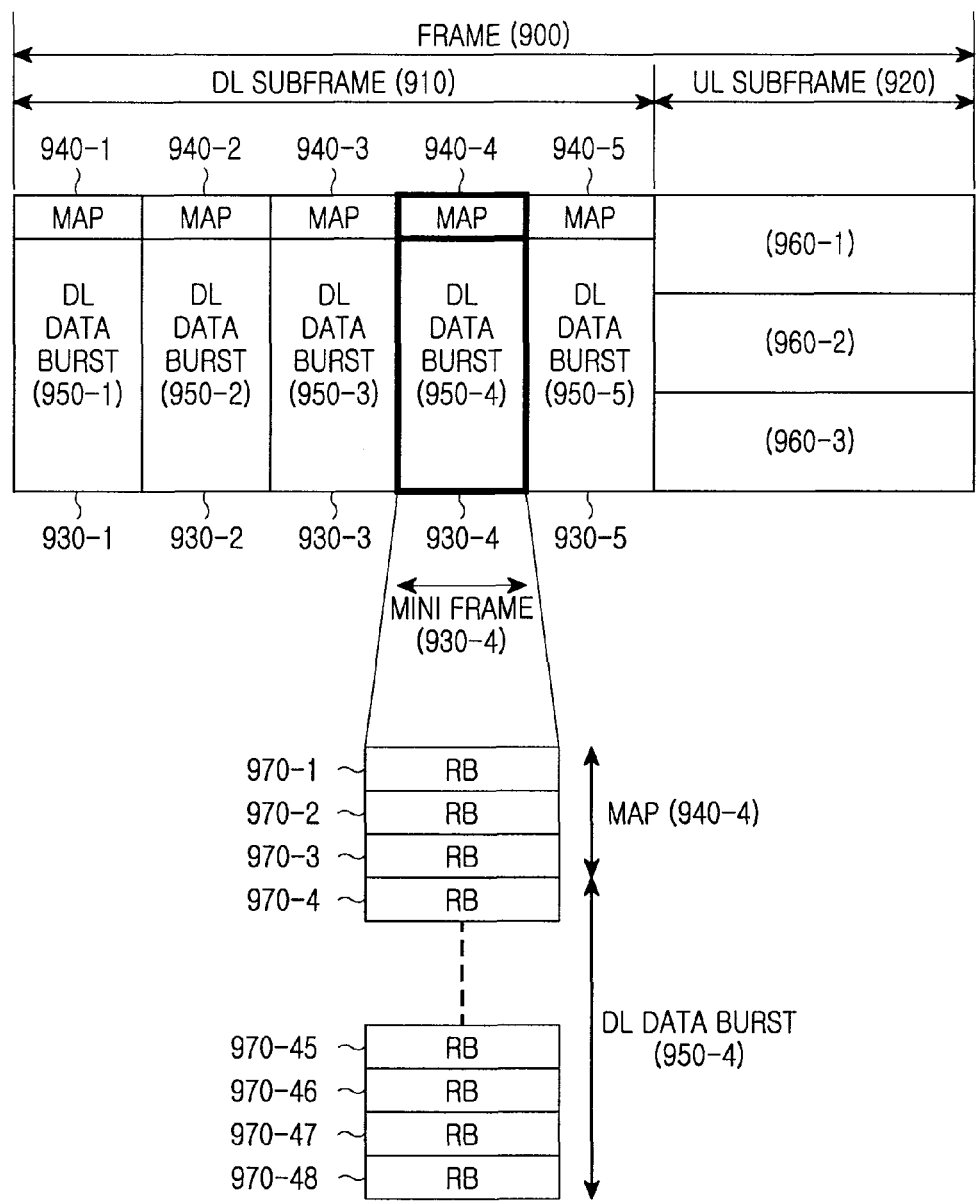
FIG. 9 is a diagram illustrating a frame structure of an IEEE 802.16m communication system according to an exemplary embodiment of the present invention.

FIG. 9 is a diagram illustrating a frame structure of an IEEE 802.16m communication system according to an exemplary embodiment of the present invention.

Referring to FIG. 9, in the IEEE 802.16m communication system, a frame 900 includes a DL subframe 910 and a UL subframe 920. The DL subframe 910 and the UL subframe 920 each include at least one mini frame. In the case of FIG. 9, the DL subframe 910 includes 5 mini frames of mini frame 930-1 to mini frame 930-5, and the UL subframe 920 includes 3 mini frames of mini frame 960-1 to mini frame 960-3. The mini frames 960-1 to 960-3 are generated by dividing the UL subframe 920 using Frequency Division Multiplexing (FDM). Although the mini frames are generated by FDM-dividing the UL subframe 920 in FIG. 9, by way of example, the mini frames can also be generated by dividing the UL subframe 920 using Time Division Multiplexing (TDM).

The mini frames 930-1 to 930-5 each include a MAP region over which a MAP message is transmitted, and a DL data burst region over which DL data is transmitted. For example, mini frame 930-4 includes a MAP region 940-4 and a DL data burst region 950-4. The mini frames 930-1, 930-2, 930-3 and 930-5 are similarly constructed.

In the IEEE 802.16m communication system, when a frame interval is 5 ms and includes 48 OFDMA symbols, one mini frame includes 6 OFDMA symbols. Further, when one RB is defined as a two-dimensional region occupied by 18 subcarriers and 6 OFDMA symbols, one mini frame includes 48 RBs. For example, the mini frame 930-4 includes a total of 48 RBs of RB 970-1 to RB 970-48. Of them, 3 RBs of RB 970-1 to RB 970-3 are included in the MAP region 940-4, and the remaining 45 RBs of RB 970-4 to RB 970-48 are included in the DL data burst region 950-4. The mini frames 930-1, 930-2, 930-3 and 930-5 are similarly constructed In terms of the number of bits that the used resource bitmap may be comprised of, the IEEE 802.16m communication system, in which one mini frame includes 48 RBs, would include a lesser number of bits than the IEEE 802.16e communication system that includes 300 slots or more.

As described above, in the IEEE 802.16m communication system, each of the mini frames included in the DL subframe includes a MAP region, and a scheme for encoding MAP IEs included in a MAP message transmitted over the MAP region can be roughly classified into two schemes. A description thereof will be made below with reference to FIGS. 10 and 11.

Figure 10:
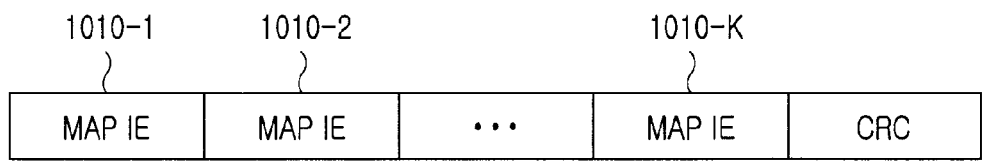
FIG. 10 is a diagram illustrating an example of encoding MAP IEs in an IEEE 802.16m communication system according to an exemplary embodiment of the present invention.

FIG. 10 is a diagram illustrating an example of encoding MAP IEs in an IEEE 802.16m communication system according to an exemplary embodiment of the present invention.

Referring to FIG. 10, when the number of MAP IEs included in a MAP message is K, a BS concatenates K MAP IEs of MAP IE 1010-1 to MAP IE 1010-K, and generates a MAP IE encoding block by adding a Cyclic Redundancy Check (CRC) thereto. The BS encodes the generated MAP IE encoding block using a defined encoding scheme.

When including K MAP IEs in one MAP IE encoding block as in FIG. 10, the BS may encode the MAP IE encoding block using a robust MCS level among its supportable MCS levels so that even an MS, which is located in the boundary of the BS's service area or cell, can correctly receive the MAP message. The BS repeatedly transmits the encoded MAP IE encoding block through the corresponding MAP region a defined number of times. In this case, since K MAP IEs are included in one MAP IE encoding block, each MAP IE may include an MS Identifier (ID) for indicating an MS that may receive the corresponding MAP IE. The MS ID can be a Connection ID (CID) or a Medium Access Control (MAC) ID.

Figure 11:
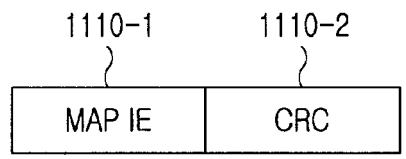
FIG. 11 is a diagram illustrating an example of encoding MAP IEs in an IEEE 802.16m communication system according to an exemplary embodiment of the present invention.

FIG. 11 is a diagram illustrating an example of encoding MAP IEs in an IEEE 802.16m communication system according to an exemplary embodiment of the present invention.

Referring to FIG. 11, when the number of MAP IEs included in a MAP message is K, a BS, unlike in FIG. 10, generates K MAP IE encoding blocks by adding a CRC to each of the K MAP IEs. That is, as illustrated in FIG. 11, the BS generates a MAP IE encoding block by adding a CRC 1110-2 to every one MAP IE 1110-1. The BS encodes the generated MAP IE encoding block according to a defined encoding scheme. Since each of the K MAP IEs is generated as a separate MAP IE encoding block, the BS can encode the MAP IE encoding block according to the channel state of the MS that may receive the corresponding MAP IE. In this case, it is not necessary to include, in the MAP IE, an ID of the MS that may receive the corresponding MAP IE, for the following reasons.

First, when the BS generates a MAP IE encoding block by adding a CRC masked using a CID or MAC ID to a MAP IE, the MAP IE encoding block has no need to include an ID of the MS that may receive the corresponding MAP IE. The CID or MAC ID used for the CRC masking can be for unicast, broadcast or multicast. In the case where the CID or MAC ID used for the CRC masking is for unicast, if an MS other than the MS that should receive the MAP IE, performs a CRC check on the MAP IE encoding block in a decoding block, an error occurs as a result of the CRC check. When the CID or MAC ID used for the CRC masking is for broadcast or multicast, all MSs perform CRC check on the MAP IE encoding block in the decoding block using the CID or MAC ID for broadcast or multicast. In this case, when the channel state between the BS and MSs is good, all MSs acquire a CRC check result indicating 'CRC OK', so they can decode the MAP IE. However, when the channel state between the BS and MSs is bad, the CRC check result may indicate a 'CRC error'. In the case where the CRC is masked with a unicast CID, if an MS that does not use the unicast CID performs decoding, an error may occur in the CRC check process.

Second, when a BS generates a MAP IE encoding block, and scrambles the generated MAP IE encoding block using a CID or MAC ID, the MAP IE encoding block has no need to include an ID of the MS that should receive the corresponding MAP IE. In this case, if an MS other than the MS that may receive the MAP IE, performs CRC check on the MAP IE encoding block in a decoding block, an error may always occur as a result of the CRC check. However, if the scrambling is performed using a broadcast CID rather than the unicast CID, all MSs can perform decoding without error unless an error occurs due to the bad channel state between the BS and the MSs in the decoding process.

As described in FIG. 11, each MAP IE is encoded at a different MCS level or in a different MAP IE encoding block size, and a scheme in which an MS decodes the MAP IE using an MCS level in several candidate groups or a MAP IE encoding block size in several candidate groups, already known to the MS, is called a blind detection scheme. The use of the blind detection scheme can reduce CID or MAC ID overhead due to the MAP IE encoding, and it is possible to encode the MAP IE using a link adaptation scheme for each MS. However, in the blind detection scheme, the MS should perform decoding using an MCS level in candidate groups or a MAP IE encoding block size in candidate groups, already known to the MS, thereby causing an increase in complexity.

That is, when an MS uses several MCS level's candidate groups, it is preferable that the MAP IE encoding block size is fixed. However, when an MS uses several MAP IE encoding block size's candidate groups, it is preferable to use one MCS level in terms of MS's decoding complexity. An exemplary embodiment of the present invention can be applied to both a case where an MS uses one MCS level and a plurality of MAP IE encoding block size's candidate groups, and another case where an MS uses a plurality of MCS level's candidate groups and one MAP IE encoding block size.

More particularly, in an exemplary embodiment of the present invention, the MAP IE encoding block size is assumed to be 48 bits. Of 48 bits, 32 bits are assumed to be used for MAP IE, and the remaining 16 bits are assumed to be used for CRC. Unlike this, when two or more MAP IE encoding block sizes are used, an MS can perform several CRC checks according to the applied MAP IE encoding block size, and perform a MAP IE decoding operation according to the several CRC check results. However, an exemplary embodiment of the present invention will be described for an exemplary case where one of a plurality of available MAP IE encoding block sizes is 48 bits.

A description will now be made of a method for allocating resources so as to prevent creation of a hole when the IEEE 802.16m communication system uses the persistent resource allocation scheme and the blind detection scheme.

As described above, when the MAP IE encoding block size is 48 bits and the remaining 32 bits except for 16 bits used for CRC are used for MAP IE, the use of the used resource bitmap described in the first exemplary embodiment may cause a problem. That is, in order to express allocation/non-allocation for all of 48 RBs included in one mini frame, the used resource bitmap should include at least 48 bits, and since only 32 bits are allocated for MAP IE, it is difficult to express allocation/non-allocation of 48 RBs. In particular, even though 32 bits are allocated for MAP IE, if 2 bits used for a Type field indicating a type of the MAP IE that are excluded, the number of bits actually used for the used resource bitmap is less than 30 bits.

Therefore, an exemplary embodiment of the present invention proposes a method for dividing RBs included in one mini frame into at least two RB regions, for example, four RB regions, to indicate allocation/non-allocation of the RBs, and the used resource bitmap used in this case will be referred to as a Resource Shifting IE.

Figure 12:
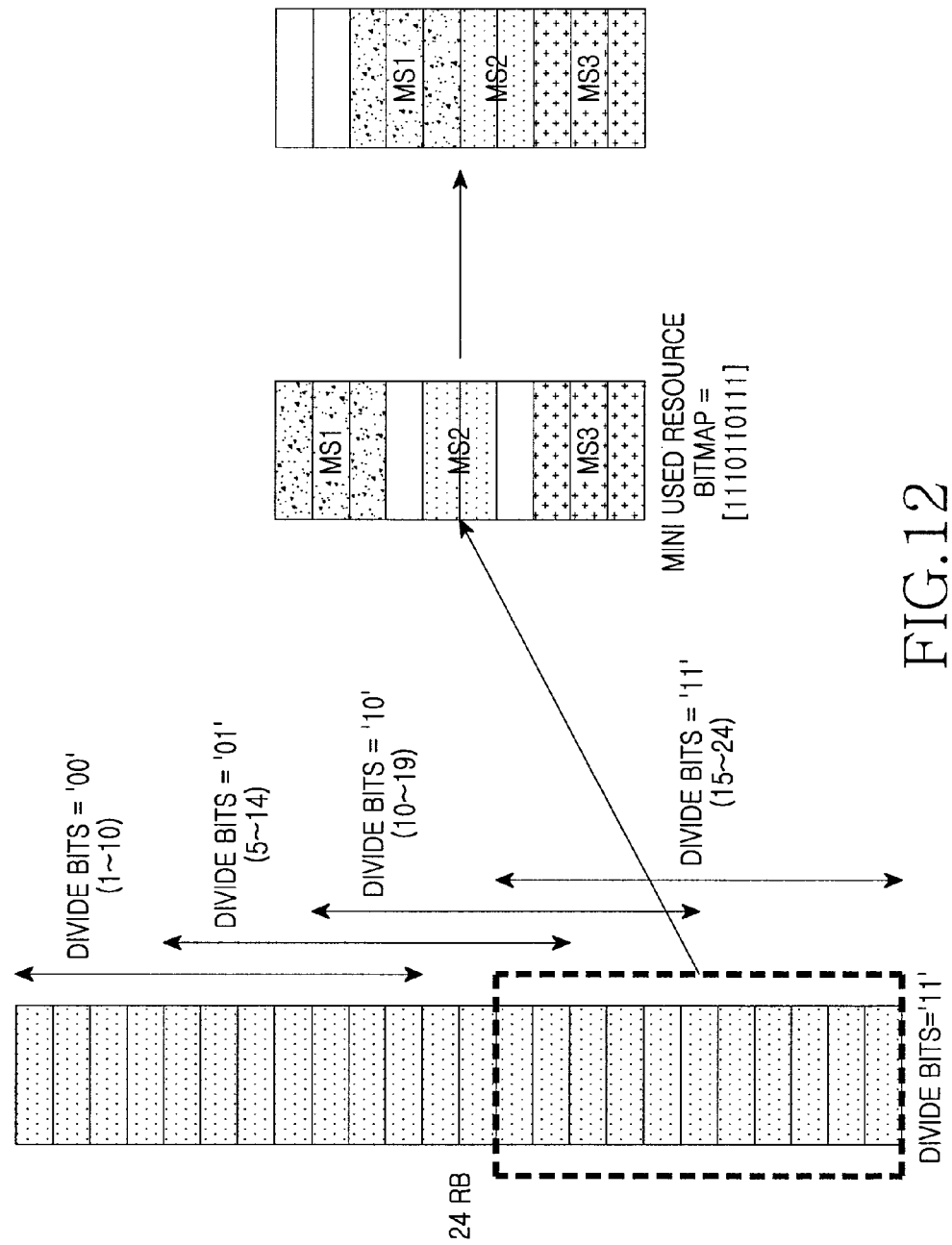
FIG. 12 is a diagram illustrating an example of a method for allocating resources using a Resource Shifting IE in an IEEE 802.16m communication system according to an exemplary embodiment of the present invention.

FIG. 12 is a diagram illustrating an example of a method for allocating resources using a Resource Shifting IE in an IEEE 802.16m communication system according to an exemplary embodiment of the present invention.

It will be assumed in FIG. 12 that the IEEE 802.16m communication system supports a mini frame structure including 24 RBs, the 24 RBs are divided into 4 RB regions, and their resource shifting direction is a downward direction. Further, it will be assumed that a Resource Shifting IE includes 12 bits, and of the 12 bits, 2 bits are used as divide bits and the remaining 10 bits are used as bits indicating a mini used resource bitmap. Unlike the used resource bitmap, the mini used resource bitmap, a bitmap included in the Resource Shifting IE, is used together with divide bits. The divide bits are bits for indicating, when the 24 RBs are divided into 4 RB regions, use/nonuse of RBs included in which one of the 4 RB regions, using the mini used resource bitmap.

For example, in FIG. 12, when the 24 RBs are RB 1 to RB 24, an RB region 1 includes RB 1 to RB 10, an RB region 2 includes RB 5 to RB 14, an RB region 3 includes RB 10 to RB 19, and an RB region 4 includes RB 15 to RB 24. Therefore, as illustrated in FIG. 12, a value of the divide bits is '00' for the RB region 1, '01' for the RB region 2, '10' for the RB region 3, and '11' for the RB region 4. That is, when a value of the divide bits is '00', 10 bits included in the mini used resource bitmap following the divide bits indicate allocation/non-allocation of RB 1 to RB 10, and when a value of the divide bits is '01', 10 bits included in the mini used resource bitmap indicate allocation/non-allocation of RB 5 to RB 14. When a value of the divide bits is '10', 10 bits included in the mini used resource bitmap indicate allocation/non-allocation of RB 10 to RB 19, and when a value of the divide bits is '11', 10 bits included in the mini used resource bitmap indicate allocation/non-allocation of RB 15 to RB 24.

Meanwhile, referring to FIG. 12, when an MS 1 uses RB 15 to RB 17, an MS 2 uses RB 19 to RB 20, and an MS 3 uses RB 22 to RB 24, and when a value of divide bits included in the Resource Shifting IE is '11', the mini used resource bitmap becomes [1110110111]. Herein, for example, when a corresponding RB is in use, its value is expressed as '1', and when the corresponding RB is not in use, its value is expressed as '0'. On the contrary, however, when a corresponding RB is in use, its value can be expressed as '0', and when the corresponding RB is not in use, its value can be expressed as '1'.

When a Resource Shifting IE with divide bits='11' and mini used resource bitmap=[1110110111] is received, the MS 1 detects that it should use the resources shifted in the downward direction by 2 RBs, determining that there are 2 unused RBs after its used RB(s). Further, the MS 2 detects that it should use the resources shifted in the downward direction by 1 RB, determining that there is one unused RB after its used RBs. However, the MS 3 detects that it should continue using the same RBs it is using, determining that there is no unused RB after its used RBs.

Figure 13:
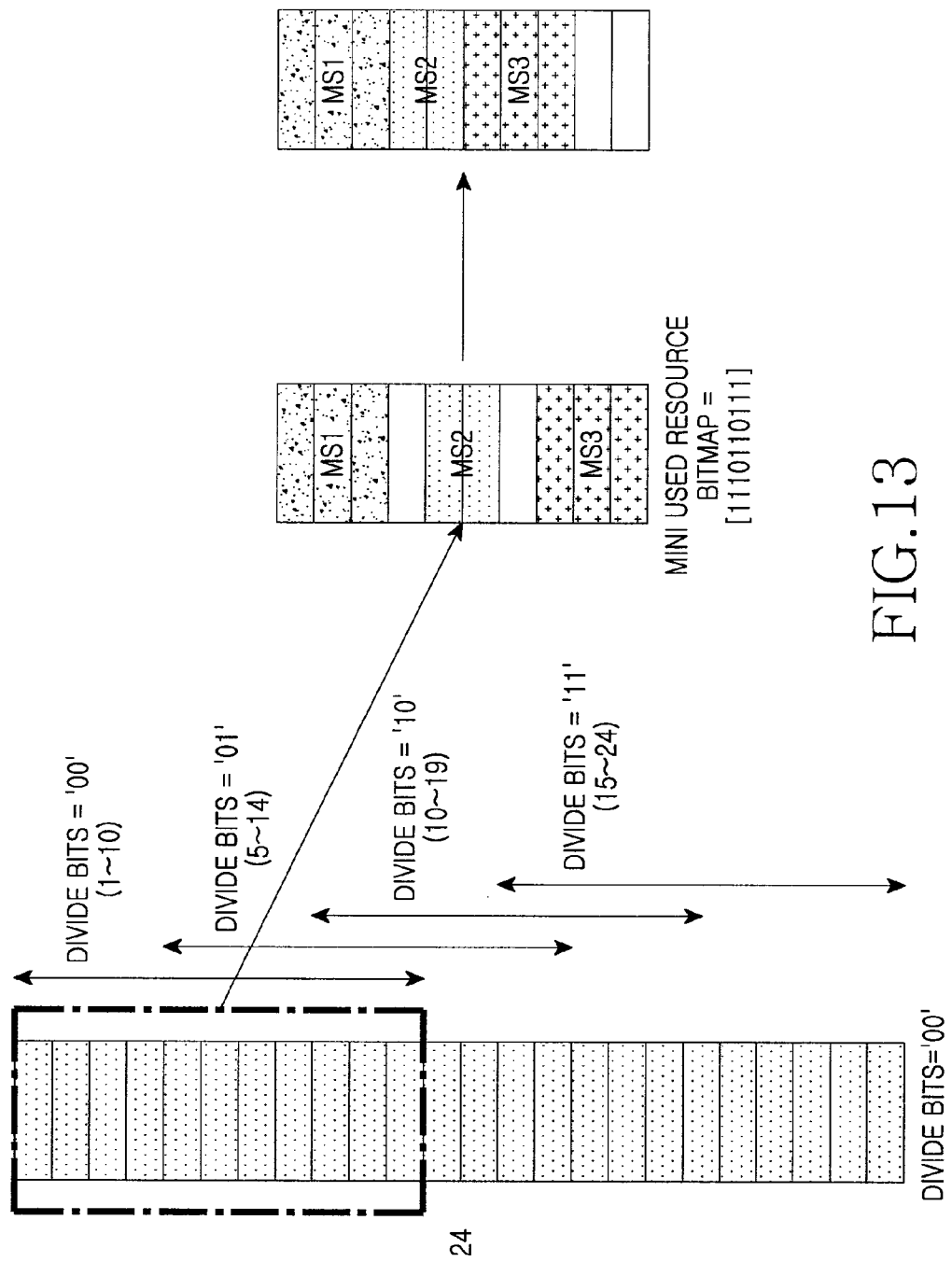
FIG. 13 is a diagram illustrating an example of a method for allocating resources using a Resource Shifting IE in an IEEE 802.16m communication system according to an exemplary embodiment of the present invention.

With reference to FIG. 13, a description will now be made of a method for allocating resources using a Resource Shifting IE when the resource shifting direction is an upward direction.

FIG. 13 is a diagram illustrating an example of a method for allocating resources using a Resource Shifting IE in an IEEE 802.16m communication system according to an exemplary embodiment of the present invention.

A resource allocation method described in FIG. 13 is similar to the resource allocation method described in FIG. 12, except that when an MS may shift resources, its resource shifting direction is not the downward direction but the upward direction. That is, in FIG. 13, if a Resource Shifting IE with divide bits='00' and mini used resource bitmap=[1110110111] is received, the MS 3 detects that it should use the resources shifted in the upward direction by 2 RBs, determining that there are 2 unused RBs before its used RBs. Further, the MS 2 detects that it should use the resources shifted in the upward direction by 1 RB, determining that there is one unused RB before its used RBs. However, the MS 1 detects that it should continue using the same RBs it is using, determining that there is no unused RB before its used RBs.

Although the Resource Shifting IE is transmitted once in the resource allocation methods of FIGS. 12 and 13, the Resource Shifting IE can be transmitted more than two times, and a resource allocation method for this case will be described with reference to FIG. 14.

Figure 14:
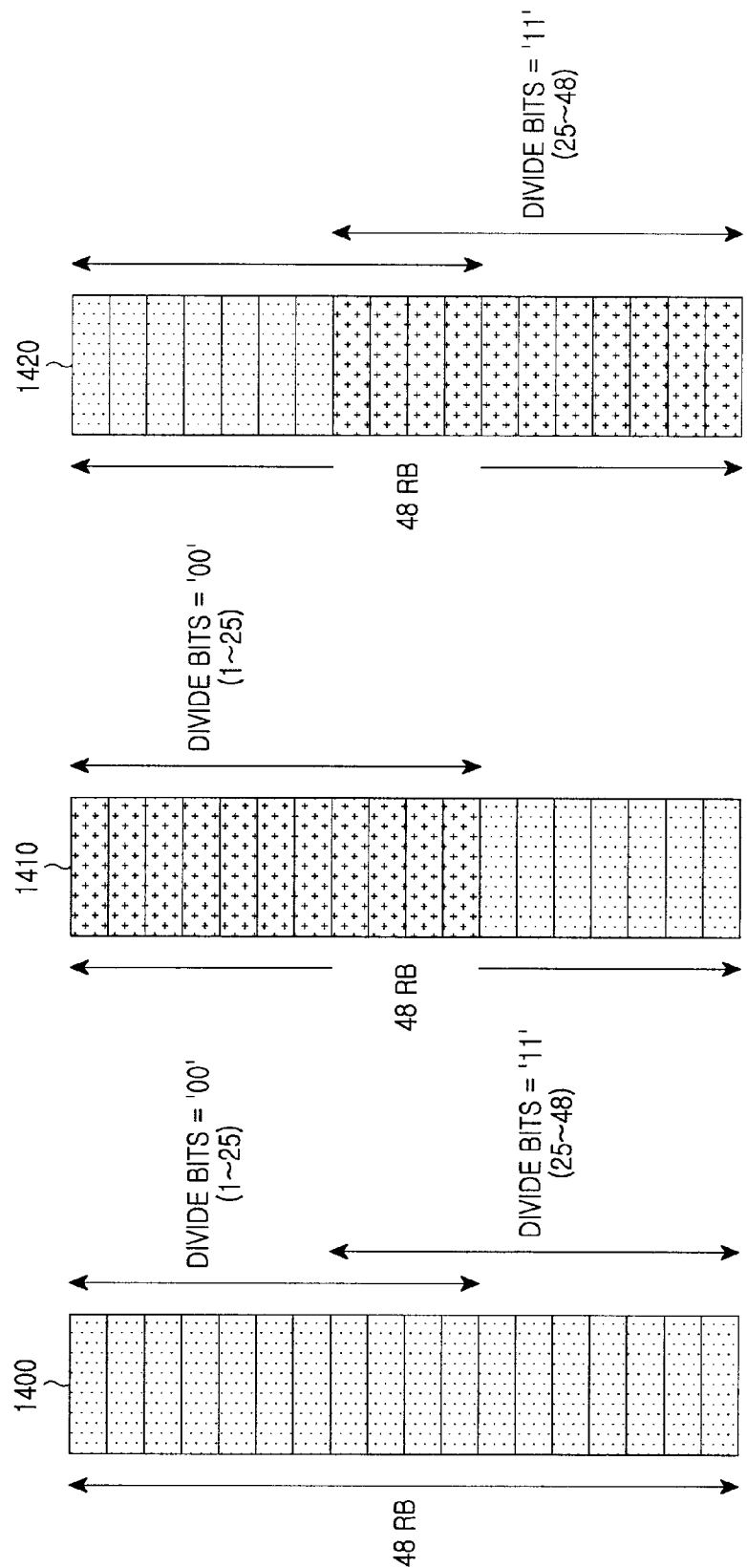
FIG. 14 is a diagram illustrating an example of a method for allocating resources using a Resource Shifting IE in an IEEE 802.16m communication system according to an exemplary embodiment of the present invention.

FIG. 14 is a diagram illustrating an example of a method for allocating resources using a Resource Shifting IE in an IEEE 802.16m communication system according to an exemplary embodiment of the present invention.

It will be assumed in FIG. 14 that the IEEE 802.16m communication system supports a mini frame structure 1400 including 48 RBs, the 48 RBs are divided into 4 RB regions, and 2 bits are used as divide bits in the Resource Shifting IE. Assuming that of the 4 RB regions, an RB region 1 includes RB 1 to RB 25 and an RB region 4 includes RB 25 to RB 48, if a value of divide bits included in the first Resource Shifting IE is set to '00', MSs using RBs included in the RB region 1 determine whether they should shift the location of their used RBs according to the mini used resource bitmap 1410. If a value of divide bits included in the second Resource Shifting IE is set to '11', MSs using RBs included in the RB region 4 determine whether they should shift the location of their used RBs according to the mini used resource bitmap 1420.

Figure 15:
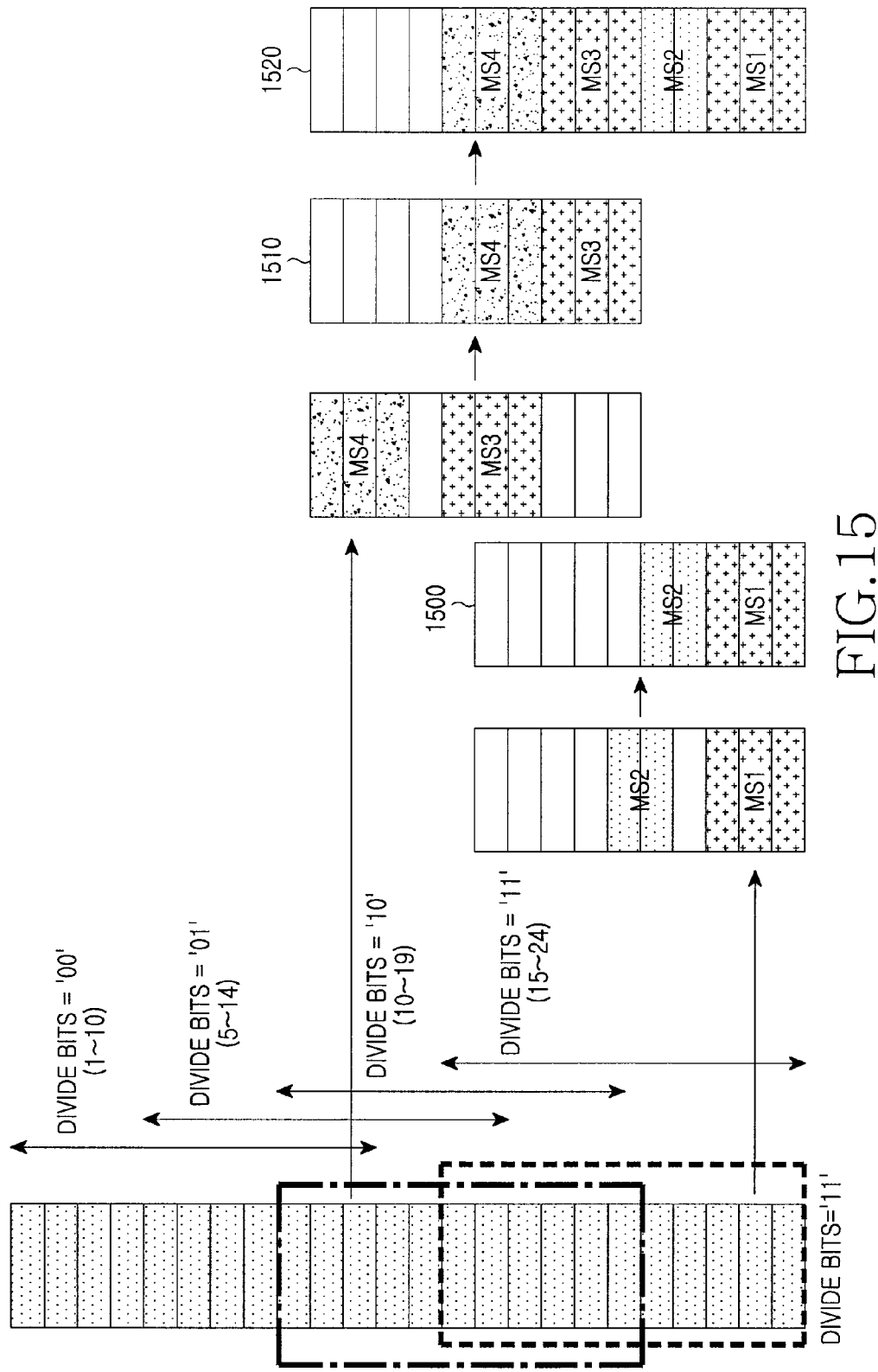
FIG. 15 is a diagram illustrating an example of a method for allocating resources using a Resource Shifting IE in an IEEE 802.16m communication system according to an exemplary embodiment of the present invention.

With reference to FIG. 15, a description will now be made of a detailed resource allocation method for the case where the Resource Shifting IE is transmitted more than two times as described in FIG. 14.

FIG. 15 is a diagram illustrating an example of a method for allocating resources using a Resource Shifting IE in an IEEE 802.16m communication system according to an exemplary embodiment of the present invention.

It will be assumed in FIG. 15 that the IEEE 802.16m communication system supports a mini frame structure and an RB region-divided structure described in FIG. 12, and transmits a Resource Shifting IE two times. Assume that a Resource Shifting IE with divide bits='11' and mini used resource bitmap=[0000110111] is transmitted first, and a Resource Shifting IE with divide bits='10' and mini used resource bitmap=[1110111000] is transmitted next.

Through the first transmission of the Resource Shifting IE, an MS 2 detects that it should use the resources shifted in the downward direction by 1 RB, determining that there is one unused RB after its used RBs in step 1500. Through the second transmission of the Resource Shifting IE, an MS 4 detects that it should use the resources shifted in the downward direction by 4 RBs, determining that there are 4 unused RBs after its used RBs. In addition, through the second transmission of the Resource Shifting IE, an MS3 detects that it should use the resources shifted in the downward direction by 3 RBs, determining that there are 3 unused RBs after its used RBs in step 1510.

As a result, it is noted in FIG. 15 that through the first transmission of the Resource Shifting IE and the second transmission of the Resource Shifting IE, the resources are packed in the downward direction in step 1520.

Meanwhile, a method for dividing RBs into RB regions using divide bits is roughly classified into two methods. A first method divides RBs into RB regions so that the RB regions overlap each other, and a second method divides RBs into RB regions so that the RB regions do not overlap each other. For convenience, the former method will be referred to as a 'first division method' and the latter method will be referred to as a 'second division method'.

The first division method, as illustrated in FIGS. 12 to 15, divides RBs such that some of RBs included in different RB regions overlap each other. The first division method is advantageous when it shifts the used resources in one direction by transmitting a Resource Shifting IE several times as described with reference to FIG. 15. Further, compared with the second division method, the first division method is advantageous in that it can correctly indicate use/nonuse of the RBs included in a particular RB region, the location of used resources of which it intends to shift, using the Resource Shifting IE.

The second division method divides RBs such that RBs included in different RB regions do not overlap each other, and a description thereof will be made with reference to FIG. 16.

Figure 16:
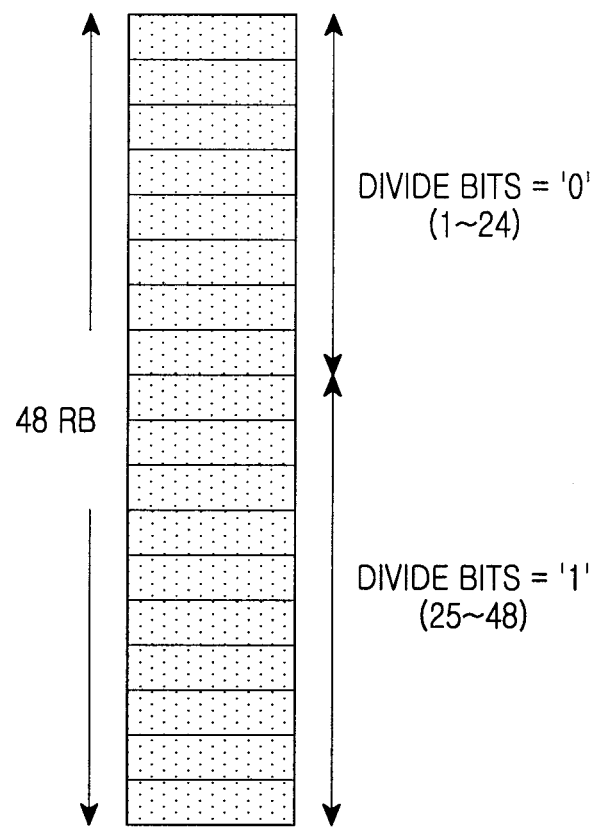
FIG. 16 is a diagram illustrating RB regions divided using a second division method according to an exemplary embodiment of the present invention.

FIG. 16 is a diagram illustrating RB regions divided using a second division method according to an exemplary embodiment of the present invention.

Referring to FIG. 16, 48 RBs are divided into 2 RB regions, an RB region 1 including RB 1 to RB 24 and an RB region 2 including RB 25 to RB 48. That is, RBs included in the RB region 1 and RBs included in the RB region 2 do not overlap each other, and in this case, the divide bits included in the Resource Shifting IE decrease to 1 in number, reducing overhead due to the divide bits.

A format of the Resource Shifting IE is as shown in Table 3.

TABLE 3

| Syntax | Size (bits) | Notes |
| --- | --- | --- |
| Type | 4 | Resource Shifting IE |
| Resource Shifting Direction | 1 | 0: upward<br>1: downward |
| Divide bits | 2 | 00: 1-25<br>01: 9-33<br>10: 17-41<br>11: 25-48 |
| Bitmap | 25 | 1: indicate used bit map<br>0: indicate unused bitmap |

In Table 3, a Type field indicates a type of the corresponding IE, and a Resource Shifting Direction field indicates the resource shifting direction. When a value of the Resource Shifting Direction field is set to a defined value, e.g., '0', it indicates that the resource shifting direction is the upward direction, and when a value of the Resource Shifting Direction field is set to a defined value, e.g., '1', it indicates that the resource shifting direction is the downward direction. A Divide bits field indicates divide bits for indicating to which RB region the mini used resource bitmap written in a Bitmap field is mapped. A value of the divide bits is '00' for an RB region including RB 1 to RB 25, '01' for an RB region including RB 9 to RB 33, '10' for an RB region including RB 17 to RB 41, and '11' for an RB region including RB 25 to RB 48. In addition, in the case where the number of bits included in the mini used resource bitmap is 25, if a value of each bit is a defined value, e.g., '0', it indicates that an RB mapped to the corresponding bit is not in used, and if a value of each bit is, for example, '1', it indicates that an RB mapped to the corresponding bit is in used.

A method for shifting resources in order to use the resources without a hole has been described so far. However, it is also possible to shift resources in a particular region among the holes remaining as a hole, and a description thereof will be made with reference to FIGS. 17 and 18.

Figure 17:
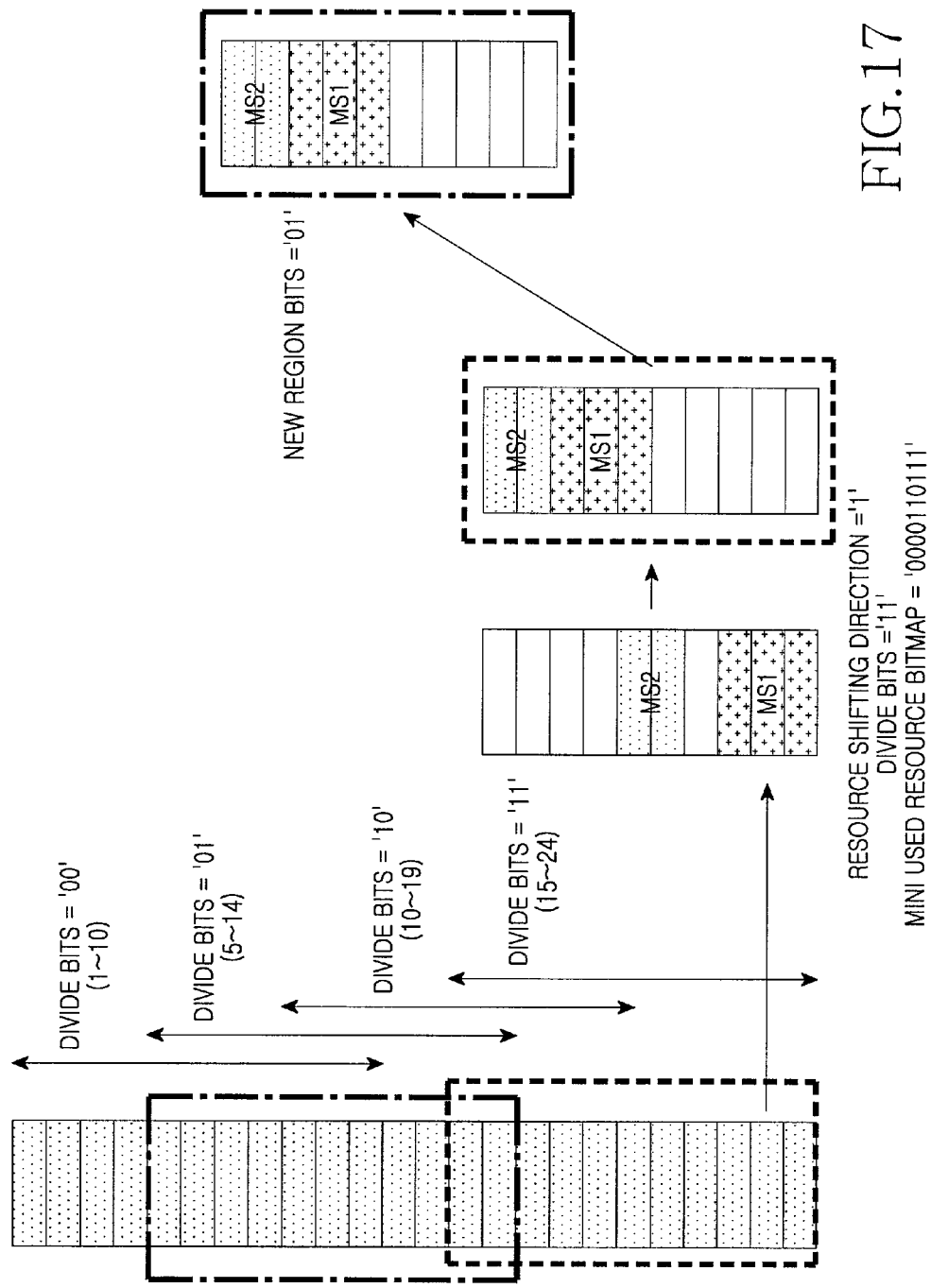
FIG. 17 is a diagram illustrating an example of a method for allocating resources using a Resource Shifting IE in an IEEE 802.16m communication system according to an exemplary embodiment of the present invention.

FIG. 17 is a diagram illustrating an example of a method for allocating resources using a Resource Shifting IE in an IEEE 802.16m communication system according to an exemplary embodiment of the present invention.

Before a description of FIG. 17 is given, it should be noted that in order to shift resources, with resources in a particular region among the holes remaining as a hole, as described above, it is necessary to additionally include New Region bits in the Resource Shifting IE. The New Region bits are used for indicating a resource region to which resources, which have already been shifted using Resource Shifting Direction field, divide bits and mini used resource bitmap included in the Resource Shifting IE, will be newly shifted again.

A method for shifting resources using the Resource Shifting IE in which even the New Region bits are included will be described in detail with reference to FIG. 17.

It will be assumed that a Resource Shifting IE is received in which a value of the Resource Shifting Direction field is '1', a value of divide bits is '11', a mini used resource bitmap is [0000110111], and a value of New Region bits is '01'. Therefore, an MS 1 detects that it should use the resources shifted by 4 RBs in the upward direction, determining that there are 4 unused RBs before its used RBs, and an MS 2 detects that it should use the resources shifted by 5 RBs in the upward direction, determining that there are 5 unused RBs before its used RBs. In this case, RBs being used by MS 1 and MS 2 are packed in an RB region 4. However, since a bit value of the New Region bits is '01', the MS 1 and MS 2 detect that they should use RBs existing in the RB region 2.

Figure 18:
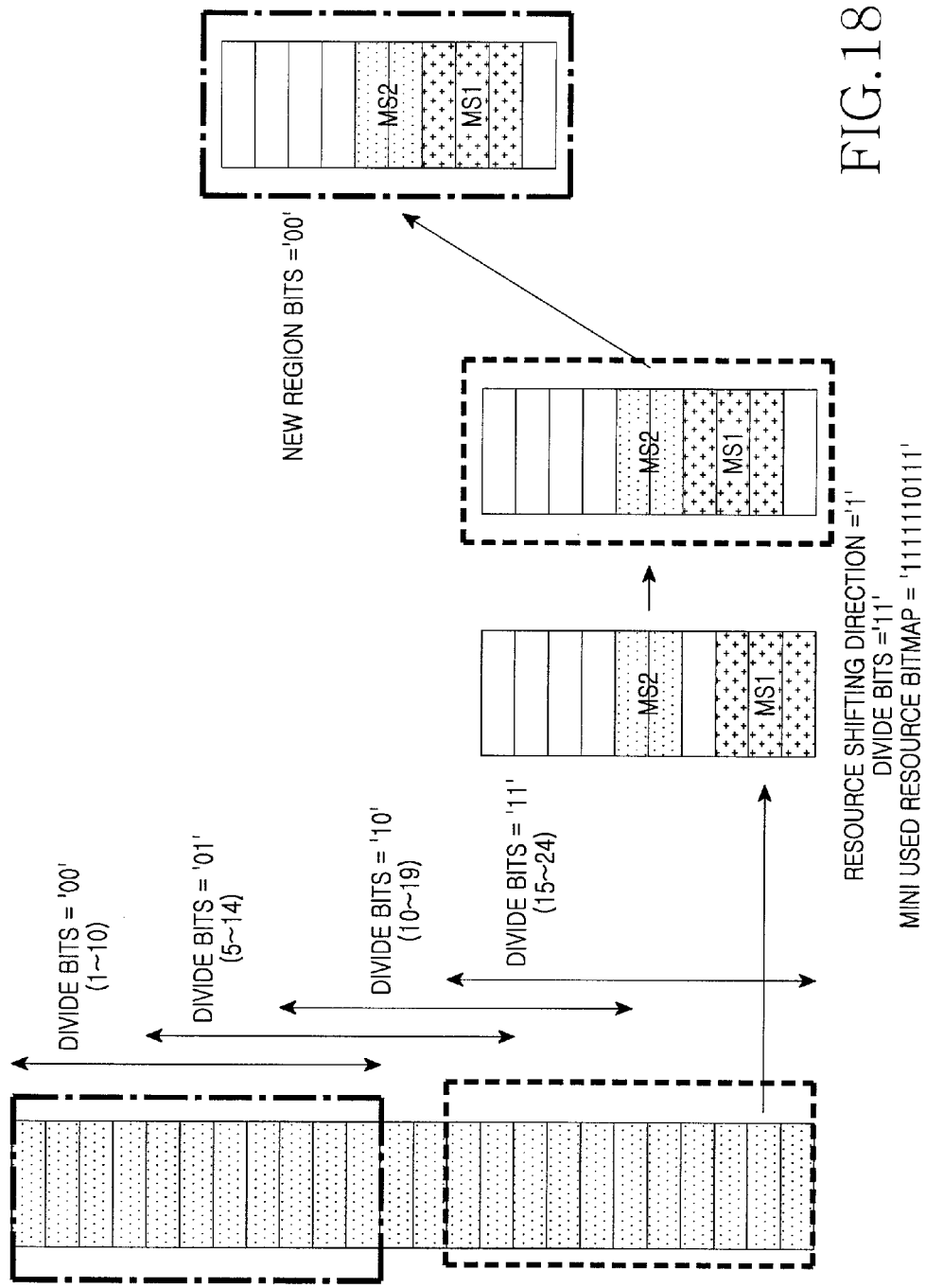
FIG. 18 is a diagram illustrating an example of a method for allocating resources using a Resource Shifting IE in an IEEE 802.16m communication system according to an exemplary embodiment of the present invention.

FIG. 18 is a diagram illustrating an example of a method for allocating resources using a Resource Shifting IE in an IEEE 802.16m communication system according to an exemplary embodiment of the present invention.

Referring to FIG. 18, it will be assumed that a Resource Shifting IE is received in which a value of the Resource Shifting Direction field is '1', a value of divide bits is '11', a mini used resource bitmap is [1111110111], and a value of New Region bits is '00'. Therefore, an MS 1 detects that it should use the resources shifted by 1 RB in the upward direction, determining that there is one unused RB before its used RBs, and an MS 2 detects that it should continue to use the RBs it is using, determining that there is no unused RB before its used RBs. In this case, RBs being used by MS 1 and MS 2 are packed in an RB region 4. In addition, since a bit value of the New Region bits is '00', the MS 1 and MS 2 detect that they should use RBs existing in the RB region 1.

In FIG. 18, although the mini used resource bitmap is [1111110111], resources RB 15 to RB 18 corresponding to the first to fourth bits of the mini used resource bitmap are unused resources as shown in the drawing. However, a BS can set the mini used resource bitmap to [1111110111], thereby making it possible to continuously maintain the RB 15 to RB 18 as a hole. A description will now be made of the cases where there is a need to maintain particular resources as a hole.

The IEEE 802.16m communication system, as described above, considers using a particular region from a mini frame as a MAP region. In this case, it is possible to generate the mini used resource bitmap by expressing, as used resources, the resources to be used as the MAP region, even though they are actually unused.

The New Region bits described in FIGS. 17 and 18 can be useful in a multi-carrier communication system, and a description thereof will be made below with reference to FIG. 19.

Figure 19:
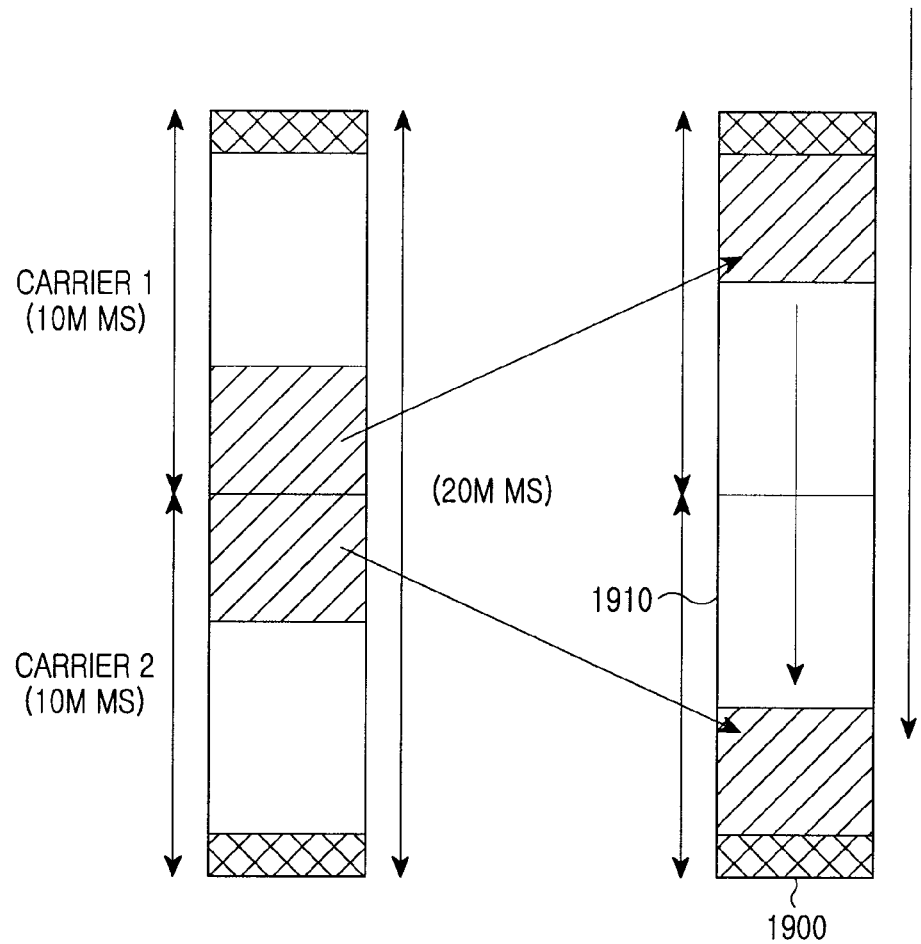
FIG. 19 is a diagram illustrating another example of a method for allocating resources using a Resource Shifting IE in an IEEE 802.16m communication system according to an exemplary embodiment of the present invention.

FIG. 19 is a diagram illustrating an example of a method for allocating resources using a Resource Shifting IE in an IEEE 802.16m communication system according to an exemplary embodiment of the present invention.

Referring to FIG. 19, a 10-Mhz bandwidth MS uses only one of a carrier 1 and a carrier 2. However, a 20-Mhz bandwidth MS recognizes the carrier 1 and the carrier 2 as if they are one continuous bandwidth, and can be allocated resources from two carriers by receiving one MAP message among the MAP messages transmitted on the carrier 1 and the carrier 2.

However, when only one carrier is used, it is advantageous to pack resource regions for using the persistent resource allocation scheme only in one direction, in terms of the resource efficiency. This is because, for the MAP message or packet-mode resources, a size of the resources used at every frame is generally variable. In the case where the carrier 1 and the carrier 2 are logically consecutively disposed in FIG. 19 (1900), if circuit-mode resources to be allocated to MSs are located in the center of the resources where the carrier 1 and the carrier 2 are logically consecutively disposed (1910), there is a limitation in allocating the resources included in each of the 2 carriers to a 20-MHz MS using one MAP. In this case, therefore, there is a need to shift the resources to be used as circuit-mode resources, in the direction where a MAP region is located, and at this point, the New Region bits can be used.

Meanwhile, in order to de-allocate the already allocated circuit-mode resources and prevent the de-allocated region from becoming a hole as described above, all MSs, which are allocated circuit-mode resources, should correctly receive the information indicating that circuit-mode resources are allocated. That is, all MSs, which are allocated the circuit-mode resources, should correctly receive MAP messages. Generally, MSs, which are allocated a high-MCS level burst profile as their channel quality is good, have a high probability that they will receive the MAP message without error. For example, in FIG. 4, the circuit-mode resources of MSs, which use a high MCS level as their channel quality is higher, are first allocated, and when the channel quality is good, the MSs are allocated a smaller number of slots to transmit the same data, compared with the case where the channel quality is bad. In addition, circuit-mode resources for a poor-channel quality MS are allocated behind the location of circuit-mode resources for a better-channel quality MS. As the corresponding circuit-mode resources are allocated backward, even though the BS cannot normally receive the MAP message including the resource de-allocation information due to de-allocation of the circuit-mode resources for other MSs, the corresponding MSs may suffer less from the effect that occurs as they cannot normally receive the MAP message since there is no need to shift the location of the allocated circuit-mode resources.

Figure 20:
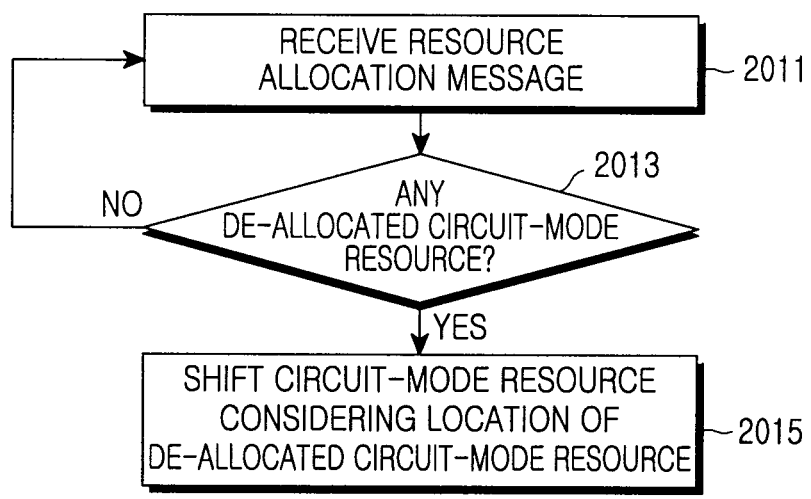
FIG. 20 is a flowchart illustrating a process in which an MS, which has already been allocated circuit-mode resources, changes a location of circuit-mode resources in an IEEE 802.16 communication system according to an exemplary embodiment of the present invention.

With reference to FIG. 20, a description will now be made of a method in which an MS, which has already been allocated circuit-mode resources, changes a location of circuit-mode resources in an IEEE 802.16 communication system according to an exemplary embodiment of the present invention.

FIG. 20 is a flowchart illustrating a process in which an MS, which has already been allocated circuit-mode resources, changes a location of circuit-mode resources in an IEEE 802.16 communication system according to an exemplary embodiment of the present invention.

Referring to FIG. 20, an MS, which is allocated circuit-mode resources, receives a resource allocation message in step 2011. In step 2013, the MS detects a used resource bitmap included in the received resource allocation message, and determines if there is any de-allocated circuit-mode resource(s) depending on the detected used resource bitmap. If it is determined that there is any de-allocated circuit-mode resource(s), the MS proceeds to step 2015 where it changes the location of the circuit-mode resources allocated to the MS itself considering the location of the de-allocated circuit-mode resource. An operation of changing the location of circuit-mode resources using the used resource bitmap has been described above.

Figure 21:
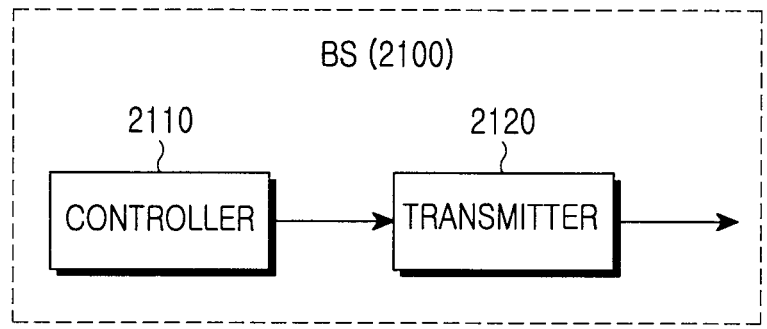
FIG. 21 is a diagram illustrating an internal structure of a BS apparatus in an IEEE 802.16 communication system according to an exemplary embodiment of the present invention.

With reference to FIG. 21, a description will now be made of an internal structure of a BS apparatus in an IEEE 802.16 communication system according to an exemplary embodiment of the present invention.

FIG. 21 is a diagram illustrating an internal structure of a BS apparatus in an IEEE 802.16 communication system according to an exemplary embodiment of the present invention.

Referring to FIG. 21, a BS apparatus 2100 includes a controller 2110 and a transmitter 2120. The controller 2110 allocates resources using the circuit-mode resource allocation scheme to prevent the creation of a hole, and generates resource allocation information for the allocated resources. The resource allocation operation of the controller 2110 is equal to the foregoing BS's resource allocation operation.

The resource allocation information generated by the controller 2110 is provided to the transmitter 2120, and the transmitter 2120 transmits the resource allocation information to MSs. The term 'resource allocation information' as used herein refers to, for example, a UL circuit-mode resource allocation message, and the resource allocation information is equal to that described in Table 1 to Table 3.

Figure 22:
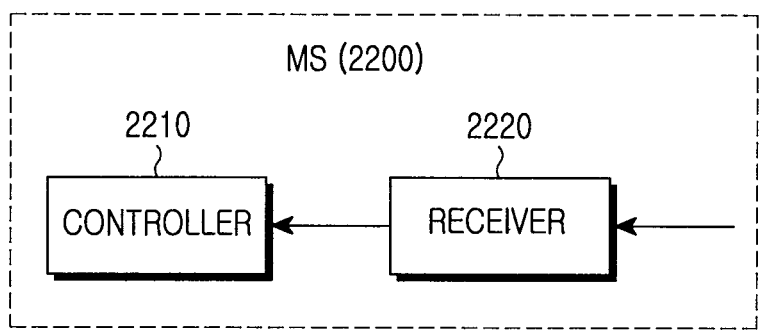
FIG. 22 is a diagram illustrating an internal structure of an MS apparatus in an IEEE 802.16 communication system according to an exemplary embodiment of the present invention.

With reference to FIG. 22, a description will now be made of an internal structure of an MS apparatus in an IEEE 802.16 communication system according to an exemplary embodiment of the present invention.

FIG. 22 is a diagram illustrating an internal structure of an MS apparatus in an IEEE 802.16 communication system according to an exemplary embodiment of the present invention.

Referring to FIG. 22, an MS apparatus 2200 includes a controller 2210 and a receiver 2220. The controller 2210 is allocated resources from a BS using the circuit-mode resource allocation scheme to prevent the creation of a hole. An operation in which the controller 2210 is allocated resources from the BS is equal to the foregoing operation in which MSs are allocated resources.

The receiver 2220 receives resource allocation information from the BS. The term 'resource allocation information' as used herein refers to, for example, a UL circuit-mode resource allocation message, and the resource allocation information is equal to that described in Table 1 to Table 3.

As is apparent from the foregoing description, according to exemplary embodiments of the present invention, the wireless communication system can allocate resources using the circuit-mode resource allocation scheme to prevent the creation of the hole, thereby contributing to an increase in the resource efficiency.

Further, according to exemplary embodiments of the present invention, the wireless communication system can allocate resources using the circuit-mode resource allocation scheme considering an MCS level, and transmit information on the de-allocated resource. In particular, the present invention can transmit information on the de-allocated resource considering the MCS level, thereby making it possible for a corresponding MS to correctly receive the information on the de-allocated resource considering the channel quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating resources by a base station (BS) in a wireless communication system, the method comprising:
   determining use/nonuse of each of a plurality of resource blocks (RBs), which are allocated based on a persistent allocation scheme;
   transmitting resource allocation information indicating the use/nonuse of each of the plurality of RBs to a plurality of mobile stations (MSs) based on a result of the determination; and
   shifting, if there is any de-allocated RB among the plurality of RBs, a location of used RBs among the remaining plurality of RBs except for the de-allocated RB in a particular direction,
   wherein the determining of the use/nonuse comprises:
      determining, for each of the plurality of RBs, whether a related RB which was previously allocated is de-allocated, or whether the related RB was not previously allocated; and
      determining the related RB as an unused RB, if the related RB is de-allocated or was not previously allocated, and
   wherein the resource allocation information includes resource shifting direction information indicating the particular direction.

2. The method of claim 1,
   wherein the resource allocation information includes a bitmap, the bitmap including a plurality of bits, and
   wherein a bit value of each of the plurality of bits included in the bitmap is a value indicating the use/nonuse of at least one RB, which is one-to-one mapped to a related bit.

3. The method of claim 2, wherein the resource allocation information comprises information indicating a size of the bitmap, and information indicating the number of RBs, which are one-to-one mapped to the plurality of bits included in the bitmap.

4. The method of claim 1,
   wherein the resource allocation information includes a plurality of sub resource allocation information, and
   wherein each of the plurality of sub resource allocation information includes information indicating the use/nonuse of at least one RB, which is one-to-one mapped to related sub resource allocation information.

5. The method of claim 1, wherein, if the plurality of RBs are divided into at least one RB region including at least one RB, the resource allocation information includes:
   at least one bitmap, the number of the at least one bitmap being equal to the number of the RB regions, and
   division information indicating to which RB region each bitmap is mapped,
   wherein each bitmap includes at least one bit, and
   wherein a bit value of the at least one bit is a value indicating use/nonuse of at least one RB, which is one-to-one mapped to a related bit.

6. A method for allocating resources by a mobile station (MS) in a wireless communication system, the method comprising:
   receiving resource allocation information indicating use/nonuse of each of a plurality of resource blocks (RBs), which are allocated by a base station (BS) based on a persistent allocation scheme; and
   using an RB allocated to the MS itself based on the resource allocation information,
   wherein for each of the plurality of RBs, the resource allocation information determines a related RB as an unused RB, if the related RB which was previously allocated is de-allocated, or if the related RB was not previously allocated,
   wherein the using of the RB allocated to the MS itself comprises:
      determining, if the resource allocation information indicates that there is a de-allocated RB among the plurality of RBs, whether it is necessary to shift a location of an RB which was previously allocated to the MS, considering a location of the de-allocated RB, and
      shifting the location of the RB which was previously allocated, in a particular direction based on the determination result, and
   wherein the resource allocation information includes resource shifting direction information indicating the particular direction.

7. The method of claim 6,
   wherein the resource allocation information includes a bitmap, the bitmap including a plurality of bits, and
   wherein a bit value of each of the plurality of bits included in the bitmap is a value indicating the use/nonuse of at least one RB, which is one-to-one mapped to a related bit.

8. The method of claim 7, wherein the resource allocation information comprises information indicating a size of the bitmap, and information indicating the number of RBs, which are one-to-one mapped to the plurality of bits included in the bitmap.

9. The method of claim 6,
   wherein the resource allocation information includes a plurality of sub resource allocation information, and
   wherein each of the plurality of sub resource allocation information includes information indicating the use/nonuse of at least one RB, which is one-to-one mapped to related sub resource allocation information.

10. The method of claim 6, wherein, if the plurality of RBs are divided into at least one RB region including at least one RB, the resource allocation information includes:
    at least one bitmap, the number of the at least one bitmap being equal to the number of the RB regions, and
    division information indicating to which RB region each bitmap is mapped,
    wherein each bitmap includes at least one bit, and
    wherein a bit value of the at least one bit is a value indicating the use/nonuse of at least one RB, which is one-to-one mapped to a related bit.

11. A base station (BS) apparatus in a wireless communication system, the apparatus comprising:
    at least one processor configured to:
       determine use/nonuse of each of a plurality of resource blocks (RBs), which are allocated based on a persistent allocation scheme,
       generate resource allocation information indicating the use/nonuse of each of the plurality of RBs based on a result of the determination, and
       shift, if there is any de-allocated RB among the plurality of RBs, a location of used RBs among the remaining plurality of RBs except for the de-allocated RB in a particular direction; and
    a transmitter configured to transmit the resource allocation information to a plurality of mobile stations (MSs),
    wherein the at least one processor is further configured to determine, for each of the plurality of RBs, whether a related RB which was previously allocated is de-allocated, or whether the related RB was not previously allocated, and determines the related RB as an unused RB, if the related RB is de-allocated or was not previously allocated, and wherein the resource allocation information includes resource shifting direction information indicating the particular direction.

12. The apparatus of claim 11,
wherein the resource allocation information includes a bitmap, the bitmap including a plurality of bits, and
wherein a bit value of each of the plurality of bits included in the bitmap is a value indicating the use/nonuse of at least one RB, which is one-to-one mapped to a related bit.

13. The apparatus of claim 12, wherein the resource allocation information comprises information indicating a size of the bitmap, and information indicating the number of RBs, which are one-to-one mapped to the plurality of bits included in the bitmap.

14. The apparatus of claim 11,
wherein the resource allocation information includes a plurality of sub resource allocation information, and
wherein each of the plurality of sub resource allocation information includes information indicating the use/nonuse of at least one RB, which is one-to-one mapped to related sub resource allocation information.

15. The apparatus of claim 11, wherein, if the plurality of RBs are divided into at least one RB region including at least one RB, the resource allocation information includes:
at least one bitmap, the number of the at least one bitmap being equal to the number of the RB regions, and
division information indicating to which RB region each bitmap is mapped,
wherein each bitmap includes at least one bit, and
wherein a bit value of the at least one bit is a value indicating the use/nonuse of at least one RB, which is one-to-one mapped to a related bit.

16. A mobile station (MS) apparatus in a wireless communication system, the apparatus comprising:
a receiver configured to receive resource allocation information indicating use/nonuse of each of a plurality of resource blocks (RBs), which are allocated by a base station (BS) based on a persistent allocation scheme; and
at least one processor configured to use an RB allocated to the MS itself based on the resource allocation information,
wherein for each of the plurality of RBs, the resource allocation information determines a related RB as an unused RB, if the related RB which was previously allocated is de-allocated, or if the related RB was not previously allocated,
wherein if the resource allocation information indicates that there is a de-allocated RB among the plurality of RBs, the at least one processor is further configured to:
determine whether it is necessary to shift a location of an RB which was previously allocated to the MS, consider a location of the de-allocated RB, and
shift the location of the RB which was previously allocated, in a particular direction based on the determination result, and
wherein the resource allocation information includes resource shifting direction information indicating the particular direction.

17. The apparatus of claim 16,
wherein the resource allocation information includes a bitmap, the bitmap including a plurality of bits, and
wherein a bit value of each of the plurality of bits included in the bitmap is a value indicating the use/nonuse of at least one RB, which is one-to-one mapped to a related bit.

18. The apparatus of claim 17, wherein the resource allocation information comprises information indicating a size of the bitmap, and information indicating the number of RBs, which are one-to-one mapped to the plurality of bits included in the bitmap.

19. The apparatus of claim 16,
wherein the resource allocation information includes a plurality of sub resource allocation information, and
wherein each of the plurality of sub resource allocation information includes information indicating the use/nonuse of at least one RB, which is one-to-one mapped to related sub resource allocation information.

20. The apparatus of claim 16, wherein, if the plurality of RBs are divided into at least one RB region including at least one RB, the resource allocation information includes:
at least one bitmap, the number of the at least one bitmap being equal to the number of the RB regions, and
division information indicating to which RB region each bitmap is mapped,
wherein each bitmap includes at least one bit, and
wherein a bit value of the at least one bit is a value indicating the use/nonuse of at least one RB, which is one-to-one mapped to a related bit.

21. A method for allocating resources by a base station (BS) in a wireless communication system, the method comprising:
persistently allocating one or more resource slots among a plurality of resource slots, the persistently allocated one or more resource slots being allocated to one or more related mobile stations (MSs);
de-allocating at least one persistently allocated resource slot of the one or more persistently allocated resource slots;
determining whether a hole related to a number of the at least one de-allocated persistently allocated resource slots is created due to the de-allocation among the one or more persistently allocated resource slots not de-allocated; and
shifting a location of at least one of the one or more non-de-allocated persistently allocated resource slots in a particular direction if it is determined that the hole is created due to the de-allocation,
wherein information indicating the particular direction is transmitted to the one or more related MSs.

22. The method of claim 21, wherein the shifting of the location of the at least one of the one or more non-de-allocated persistently allocated resource slots comprises:
shifting the location of the at least one of the one or more non-de-allocated persistently allocated resource slots to reduce the number of the at least one de-allocated persistently allocated resource slots related to the hole.

23. The method of claim 22, wherein the shifting of the location of the at least one of the one or more non-de-allocated persistently allocated resource slots to reduce the number of the at least one de-allocated persistently allocated resource slots related to the hole comprises one of:
shifting the location of the at least one of the one or more non-de-allocated persistently allocated resource slots based on the number of the at least one de-allocated persistently allocated resource slots, or
shifting the location of the at least one of the one or more non-de-allocated persistently allocated resource slots to reduce the number of the de-allocated persistently allocated resource slots related to the hole created among the one or more non-de-allocated persistently allocated resource slots.

24. The method of claim 21, wherein the determining of whether the hole related to the number of the at least one de-allocated persistently allocated resource slots is created due to the de-allocation comprises:
   determining that the hole is created, based on a comparison between an offset of the at least one de-allocated persistently allocated resource slot and an offset of the one or more non-de-allocated persistently allocated resource slots,
   wherein the offsets indicate an allocation start location of a related resource slot.

25. A method for using allocated resources by a mobile station (MS) in a wireless communication system, the method comprising:
   receiving a resource allocation message used for persistently allocating at least one resource slot;
   receiving a message including de-allocation information of at least one resource slot;
   determining whether a hole related to a number of de-allocated resource slots is created among one or more persistently allocated resource slots based on the received de-allocation information;
   determining, if the hole is created, whether to shift a location of at least one resource slot persistently allocated to the MS; and
   shifting the location of the at least one persistently allocated resource slot in a particular direction if it is determined to shift the location,
   wherein the resource allocation message includes information indicating the particular direction.

26. The method of claim 25, wherein the shifting of the location of the at least one persistently allocated resource slot comprises:
   shifting the location of the at least one persistently allocated resource slot to reduce the number of de-allocated resource slots related to the hole.

27. The method of claim 26, wherein the shifting of the location of the at least one persistently allocated resource slot to reduce the number of de-allocated resource slots related to the hole comprises one of:
   shifting the location of the at least one persistently allocated resource slot based on the number of de-allocated resource slots, and
   shifting the location of the at least one persistently allocated resource slot to reduce the number of de-allocated resource slots related to the hole created among the one or more persistently allocated resource slots.

28. The method of claim 25, wherein the determining of whether the hole related to the number of de-allocated resource slots is created among the one or more persistently allocated resource slots comprises:
   determining that the hole is created, based on a comparison between an offset of at least one de-allocated resource slot and an offset of one or more non-de-allocated resource slots,
   wherein the offsets indicate an allocation start location of a related resource slot.

29. A method for allocating resources in a wireless communication system, the method comprising:
   persistently allocating, by a base station (BS), one or more resource slots among a plurality of resource slots, the persistently allocated one or more resource slots being allocated to one or more related mobile stations (MSs), and transmitting, to the one or more related MSs, a resource allocation message for persistently allocating the one or more persistently allocated resource slots;
   receiving, by the one or more related MSs, the resource allocation message;
   de-allocating, by the BS, at least one persistently allocated resource slot of the one or more persistently allocated resource slots, and transmitting, to at least one of the one or more related MSs, a message including de-allocation information of the at least one de-allocated resource slot;
   receiving, by the at least one MS, the message;
   determining, by the BS, whether a hole related to a number of de-allocated persistently allocated resource slots is created due to the de-allocation among the one or more persistently allocated resource slots not de-allocated;
   shifting, by the BS, a location of at least one of the one or more non-de-allocated persistently allocated resource slots if it is determined that the hole is created due to the de-allocation;
   determining, by each of the at least one MS, whether the hole related to the number of de-allocated resource slots is created among the one or more non-de-allocated persistently allocated resource slots based on the received de-allocation information;
   determining, by each of the at least one MS, whether to shift a location of at least one resource slot persistently allocated to itself, if the hole is determined to be created according to the received de-allocation information; and
   shifting, by each of the at least one MS, the location of its at least one persistently allocated resource slot, if the location is determined to be shifted.

30. The method of claim 29, wherein the shifting of the location of the at least one of the one or more non-de-allocated persistently allocated resource slots by the BS comprises:
   shifting, by the BS, the location of the at least one of the one or more non-de-allocated persistently allocated resource slots to reduce the number of de-allocated persistently allocated resource slots related to the hole.

31. The method of claim 30, wherein the shifting of the location of the at least one of the one or more non-de-allocated persistently allocated resource slots to reduce the number of de-allocated persistently allocated resource slots related to the hole comprises one of:
   shifting, by the BS, the location of the at least one of the one or more non-de-allocated persistently allocated resource slots based on a number of the at least one de-allocated persistently allocated resource slot, and
   shifting the location of the at least one of the one or more non-de-allocated persistently allocated resource slots to reduce the number of de-allocated resource slots related to the hole created among the one or more non-de-allocated persistently allocated resource slots.

32. The method of claim 29, wherein the determining by at least one of the BS and each of the at least one MS, whether the hole related to the number of de-allocated persistently allocated resource slots is created among the one or more non-de-allocated persistently allocated resource slots comprises:
   determining by at least one of the BS and each of the at least one MS that the hole is created, based on a comparison between an offset of the at least one de-allocated persistently allocated resource slot and an offset of the one or more non-de-allocated persistently allocated resource slots, wherein the offsets indicate an allocation start location of a related resource slot.

33. The method of claim 29, wherein the shifting of the location of its at least one persistently allocated resource slot by each of the at least one MS comprises:
shifting, by each of the at least one MS, the location of its at least one persistently allocated resource slot to reduce the number of de-allocated persistently allocated resource slots related to the hole.

34. The method of claim 33, wherein the shifting of the location of its at least one persistently allocated resource slot by each of the at least one MS to reduce the hole comprises one of:
shifting, by each of the at least one MS, the location of the at least one persistently allocated resource slot based on a number of the at least one de-allocated persistently allocated resource slot, and
shifting the location of the at least one persistently allocated resource slot to reduce the number of de-allocated persistently allocated resource slots related to the hole created among the one or more non-de-allocated persistently allocated resource slots.

35. A base station (BS) apparatus in a wireless communication system, the apparatus comprising:
a memory; and
at least one processor configured to:
persistently allocate one or more resource slots among a plurality of resource slots, the persistently allocated one or more resource slots being allocated to one or more related mobile stations (MSs),
de-allocate at least one persistently allocated resource slot of the one or more persistently allocated resource slots,
determine whether a hole related to a number of de-allocated resource slots is created due to the de-allocation among the one or more persistently allocated resource slots not de-allocated, and
shift a location of at least one of the one or more non-de-allocated persistently allocated resource slots in a particular direction if it is determined that the hole is created due to the de-allocation,
wherein information indicating the particular direction is transmitted to the one or more related MSs.

36. A mobile station (MS) apparatus in a wireless communication system, the apparatus comprising:
a receiver configured to:
receive a resource allocation message used for persistently allocating at least one resource slot, and
receive a message including de-allocation information of at least one resource slot; and
at least one processor configured to:
determine whether a hole related to a number of de-allocated resource slots is created among one or more persistently allocated resource slots based on the received de-allocation information,
determine whether to shift a location of at least one resource slot persistently allocated to the MS if the hole is created, and
shift the location of the at least one persistently allocated resource slot in a particular direction if it is determined to shift the location,
wherein the resource allocation message includes information indicating the particular direction.

37. A wireless communication system, the system comprising:
a base station (BS) for:
persistently allocating one or more resource slots among a plurality of resource slots, the persistently allocated one or more resource slots being allocated to one or more related mobile stations (MSs),
transmitting, to the one or more related MSs, a resource allocation message for persistently allocating the one or more resource slots,
de-allocating at least one persistently allocated resource slot of the one or more persistently allocated resource slots,
transmitting, to at least one of the one or more related MSs, a message including de-allocation information of the at least one de-allocated persistently allocated resource slot,
determining whether a hole related to a number of de-allocated persistently allocated resource slots is created due to the de-allocation among the one or more persistently allocated resource slots not de-allocated, and
shifting a location of at least one of the one or more non-de-allocated persistently allocated resource slots if it is determined that the hole is created due to the de-allocation; and
the one or more related MSs, each for:
receiving the resource allocation message,
receiving the message,
determining whether the hole related to the number of de-allocated persistently allocated resource slots is created among the one or more non-de-allocated persistently allocated resource slots based on the received de-allocation information,
determining whether to shift a location of at least one resource slot persistently allocated to itself if the hole is determined to be created according to the received de-allocation information, and
shifting the location of its at least one persistently allocated resource slot in a particular direction if the location is determined to be shifted.

* * * * *